(12) United States Patent
Schultz et al.

(10) Patent No.: US 10,948,047 B1
(45) Date of Patent: Mar. 16, 2021

(54) MODULAR DRIVE APPARATUS

(71) Applicant: Logan Clutch Corporation, Westlake, OH (US)

(72) Inventors: Charles D. Schultz, Winfield, IL (US); Stefan Vinca, Westlake, OH (US)

(73) Assignee: LOGAN CLUTCH CORPORATION, Westlake, OH (US)

( * ) Notice: Subject to any disclaimer, the term of this patent is extended or adjusted under 35 U.S.C. 154(b) by 1053 days.

(21) Appl. No.: 15/333,992

(22) Filed: Oct. 25, 2016

Related U.S. Application Data

(60) Provisional application No. 62/314,603, filed on Mar. 29, 2016, provisional application No. 62/248,347, filed on Oct. 30, 2015.

(51) Int. Cl.
| | |
|---|---|
| *F16H 1/22* | (2006.01) |
| *F16H 57/025* | (2012.01) |
| *F16H 57/021* | (2012.01) |
| *F16H 1/20* | (2006.01) |

(52) U.S. Cl.
CPC ............ *F16H 1/22* (2013.01); *F16H 1/20* (2013.01); *F16H 57/021* (2013.01); *F16H 57/025* (2013.01)

(58) Field of Classification Search
CPC . F16H 1/20; F16H 1/22; F16H 57/021; F16H 57/025; F16H 2057/02026; B06K 17/28
USPC .......... 74/665 GA, 665 B, 665 GB; 310/112; 123/DIG. 8; 290/4 C; 418/199
See application file for complete search history.

(56) References Cited

U.S. PATENT DOCUMENTS

| | | | | | |
|---|---|---|---|---|---|
| 2,162,979 | A * | 6/1939 | Simpson | ................ | B60K 17/28 74/342 |
| 2,452,709 | A * | 11/1948 | Aiman | ................ | B23B 39/162 184/6.12 |
| 5,267,477 | A * | 12/1993 | Irikura | ................ | B60K 17/00 180/53.1 |
| 5,557,980 | A * | 9/1996 | Mastroianni | .......... | B60K 17/28 192/54.3 |
| 6,223,848 | B1 * | 5/2001 | Young | ................. | B60K 17/105 180/242 |
| 6,634,459 | B1 * | 10/2003 | Litkenhus | ............... | F04C 2/086 184/6.12 |
| 7,163,077 | B2 * | 1/2007 | Hasegawa | ............ | B60K 17/105 180/292 |
| 7,765,884 | B2 * | 8/2010 | Frait | ..................... | B60K 17/28 74/15.84 |

(Continued)

FOREIGN PATENT DOCUMENTS

WO  WO 2007/108805  *  9/2007

*Primary Examiner* — William C Joyce
(74) *Attorney, Agent, or Firm* — Ralph E. Jocke; Walker & Jocke

(57) ABSTRACT

A modular drive apparatus includes a gear box (16) with a rotatable internal transmission gear (60). The gear box includes a plurality of body openings (44). The openings may be selectively closed by the installation of cover plates (52, 54). With a cover plate removed, a drive coupler (32, 34, 58, 148) may be extended in the respective opening and mounted in operative connection with the gear box. In the mounted position of the drive coupler, an idler gear (72, 172) engages the ring gear of the gear box. Rotatable power devices such as pumps, motors and generators may be operatively rotatably engaged with the drive coupler.

29 Claims, 17 Drawing Sheets

(56) References Cited

U.S. PATENT DOCUMENTS

| | | | |
|---|---|---|---|
| 9,371,000 B2* | 6/2016 | Goleski | F16H 47/08 |
| 9,783,049 B2* | 10/2017 | Frait | B60K 17/02 |
| 9,994,102 B2* | 6/2018 | Simon | B60K 17/28 |
| 2008/0141800 A1* | 6/2008 | Seitz | A62C 25/005 74/15.82 |
| 2009/0114045 A1* | 5/2009 | Wilson | B60K 17/28 74/11 |

* cited by examiner

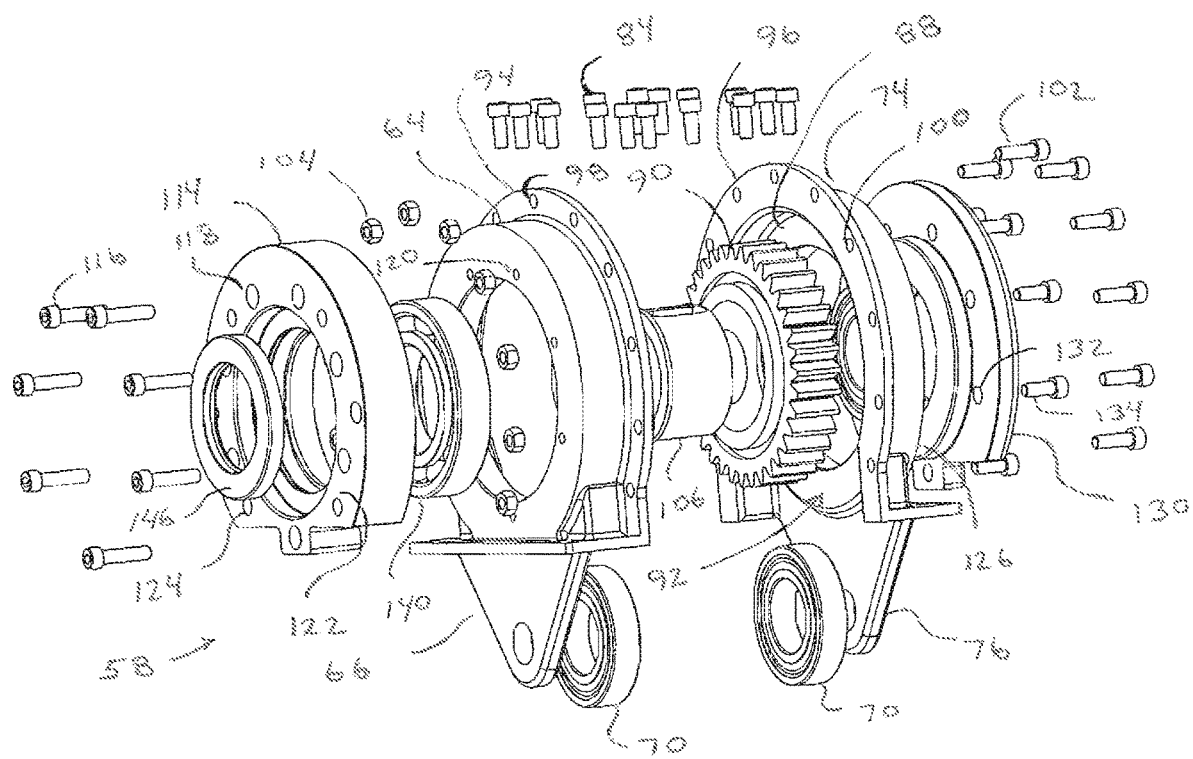
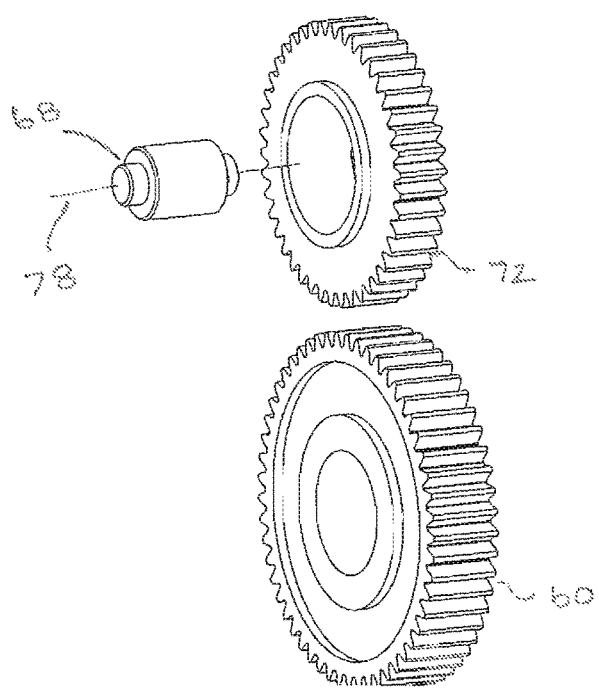
FIG 8

US 10,948,047 B1

MODULAR DRIVE APPARATUS

CROSS REFERENCE TO RELATED APPLICATIONS

This application claims benefit pursuant to 35 U.S.C. § 119(e) of Provisional Application 62/248,347 filed Oct. 30, 2015 and Provisional Application 62/314,603 filed Mar. 29, 2016, the disclosures of each of which are incorporated herein by reference in their entirety.

TECHNICAL FIELD

This disclosure relates to mechanical power transmission devices and systems. Exemplary embodiments relate to a modular drive apparatus used for transmitting rotational power.

BACKGROUND OF THE DISCLOSURE

Power transmission systems are used to selectively deliver rotational power from a driver such as an internal combustion engine, electric motor or other source of rotational power, to one or more driven devices. Driven devices commonly include such things as pumps, electric generators, rotating machinery, the tires of a vehicle or a propeller of a water craft. Drive systems are used to selectively deliver power from the driver to the driven device.

Drive systems may have numerous different configurations. It is also not uncommon to have a need to make changes to the configuration of a drive system. Such changes may include the need to incorporate new devices and components. The configuration of drive systems sometimes make the systems difficult to reconfigure or make implementing changes difficult.

Drive systems may benefit from improvements.

OBJECTS OF EXEMPLARY EMBODIMENTS

It is an object of exemplary embodiments to provide a modular drive apparatus.

It is a further object of exemplary embodiments to provide a drive apparatus that may be more readily configured.

It is a further object of exemplary embodiments to provide a drive apparatus that may be readily changed.

It is a further object of exemplary embodiments to provide a drive apparatus that may be used in numerous different service applications.

It is a further object of exemplary embodiments to provide a hybrid drive apparatus.

It is a further object of exemplary embodiments to provide methods of configuration and operation of a drive apparatus.

Further objects of exemplary embodiments will be made apparent in the detailed description of exemplary embodiments and the appended claims.

BRIEF DESCRIPTION OF DRAWINGS

FIG. 8 is an isometric exploded view of the drive coupler of FIG. 7.

DETAILED DESCRIPTION OF EXEMPLARY EMBODIMENTS

Figure 1:
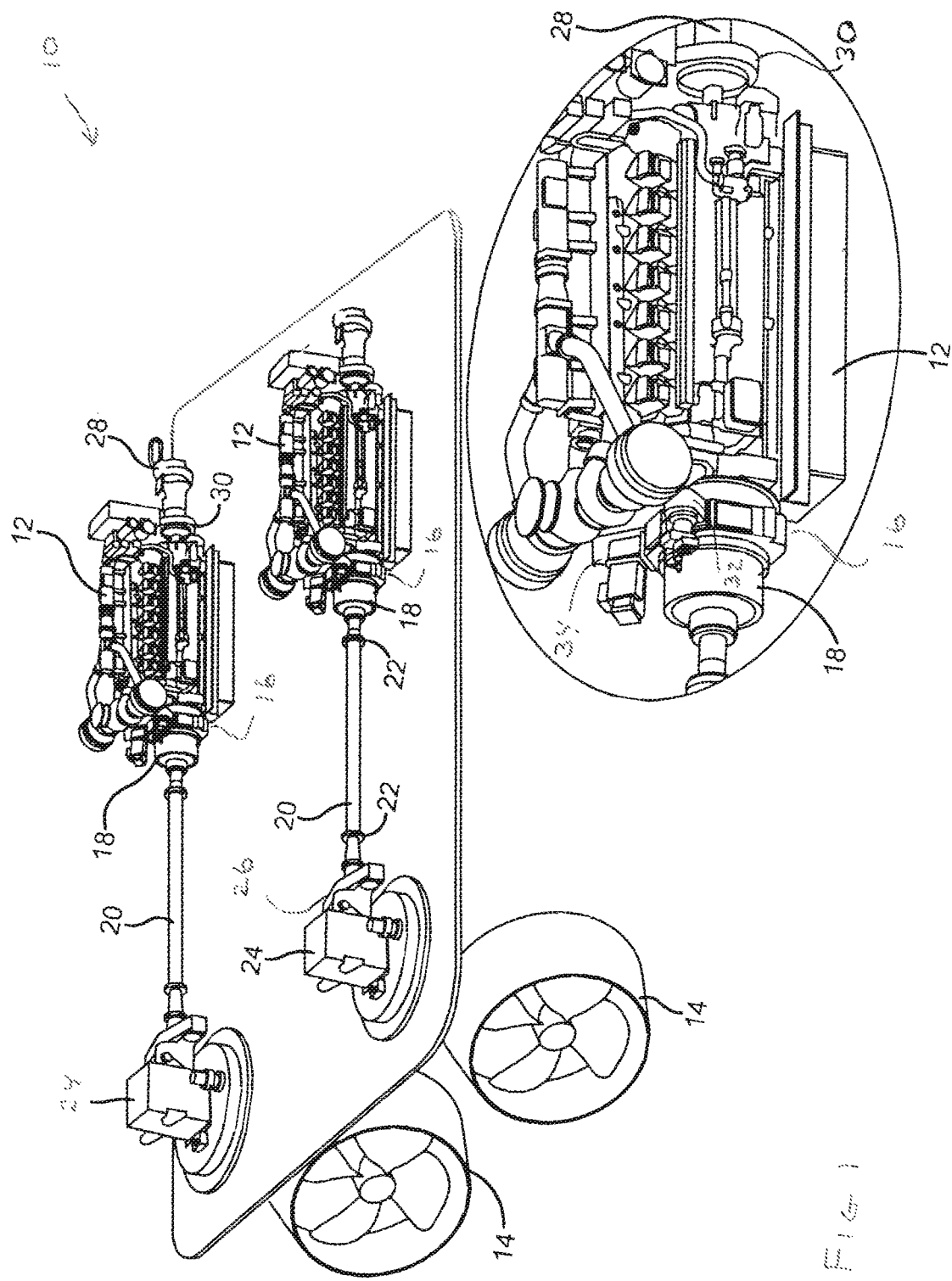
FIG. 1 is an isometric schematic view of an exemplary drive and power transmission platform.

Referring now to the drawings and particularly to FIG. 1, there is shown therein an exemplary drive platform 10. Exemplary drive platform 10 shows driver devices, driven devices and power transmission devices associated therewith. In the exemplary arrangement, drive platform 10 is associated with a marine vehicle such as a ship. It should be understood that this device arrangement is exemplary of numerous different drive platforms and power transmission arrangements in which the principles described herein may be used.

Drive platform 10 includes a pair of engines 12. In the exemplary embodiment, engines 12 are internal combustion engines. The internal combustion engines 12 drive respective driven devices which comprise thrusters 14 that include propellers. Each of the engines 12 is respectively connected through a modular drive gear box 16 to a respective clutch 18. The clutches in exemplary embodiments may be hydraulic or pneumatic actuated clutches that are operative to selectively engage and disengage rotational power that is transmitted from the engine through the gear box 16 to a respective drive shaft 20. Each respective drive shaft is connected through a coupling 22 to a respective thruster gear box 24. Each respective gear box 24 of the exemplary embodiment is operative to control the angular position of and to transmit power to a respective thruster 14. Each respective gear box 24 includes a clutch 26. Clutch 26 of exemplary embodiments may include a hydraulic, pneumatic or electrically actuated clutch which is used for selectively engaging gears which are utilized for purposes of angularly positioning the thrusters.

In the exemplary drive platform arrangement the side of each engine 12 opposed of the gear box 16 includes a clutch 30. Each clutch 30 is used to selectively engage and disengage the engine and a pump 28. In exemplary arrangements, pump 28 may be a water pump such as a firefighting pump. Alternatively in other arrangements the pump may operate as a bilge pump or a process pump for pumping types of materials which are utilized in connection with the vehicle in which the platform 10 is used. Of course it should be understood that this configuration of the drive platform is exemplary and in other arrangements, other configurations and devices may be utilized. Exemplary embodiments may utilize clutches and other features described in U.S. patent application Ser. No. 14/731,517 filed Jun. 5, 2015, the disclosure of which is incorporated herein by reference in its entirety.

The exemplary modular drive gear box 16 includes in engagement therewith, drive couplers 32, 34. Each of the drive couplers 32, 34 are in operative connection with a rotatable power device. Such rotatable power devices may include devices such as pumps, generators or other devices that utilize or consume mechanical power. Other rotatable power devices may include motors or other devices that produce or deliver mechanical power. For purposes of this disclosure, devices that either use power or deliver power are referred to as rotatable power devices, unless otherwise specifically indicated.

Figure 2:
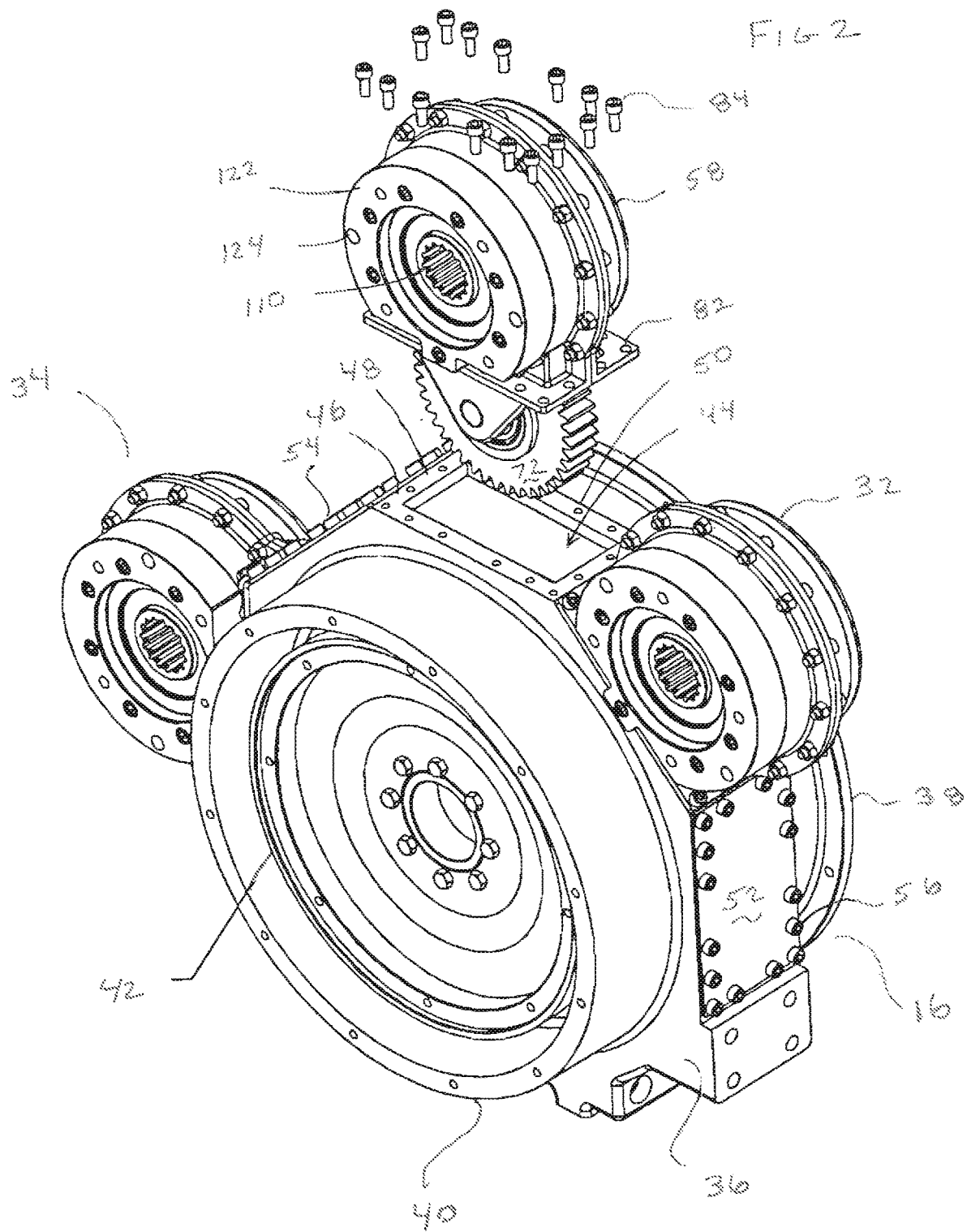
FIG. 2 is an isometric view of an exemplary modular drive apparatus.

FIG. 2 shows the exemplary gear box 16 in greater detail. Gear box 16 includes a body 36. Body 36 includes a flange 38 which in conjunction with fasteners, is utilized to attach the gear box in operative connection with a driver such as engine 12. The body further includes a mounting ring 40. Mounting ring 40 is used in an exemplary arrangement to attach the gear box to a further power transmission device such as the housing of clutch 18. In exemplary arrangements the gear box may include a damper 42 or other devices or mechanisms usable in connection with transmitting rotational power from the engine or other driver to the remainder of the drive system.

In the exemplary arrangement, the gear box body includes a plurality of disposed body openings 44. Each of the body openings is angularly disposed on the body. Each body opening is bounded by a mount which includes a rectangular mounting flange 46 which includes a planar flange face 48. A plurality of fastener accepting openings 50 extend in the planar flange face. Each of the fastener accepting openings is configured to accept a fastener such as a bolt.

In the exemplary arrangement, each of the mounting flanges is configured to accept in releasible engagement therewith, a cover plate such as cover plates 52 and 54. Each of the cover plates is configured to close a respective body opening 44. The cover plates are held in engagement with the body 16 to close the respective opening by a plurality of bolts or other fasteners 56. In the exemplary arrangement, the cover plates may be selectively installed in engagement with the body to close an opening that is not utilized. The exemplary cover plates can be removed when it is desired to install a removable drive coupler such as couplers 32, 34 or 58 in engagement with the gear box 16. For purposes hereof "releasible" shall have the same meaning as "releasable" and "releasibly" shall have the same meaning as "releasably."

Figure 3:
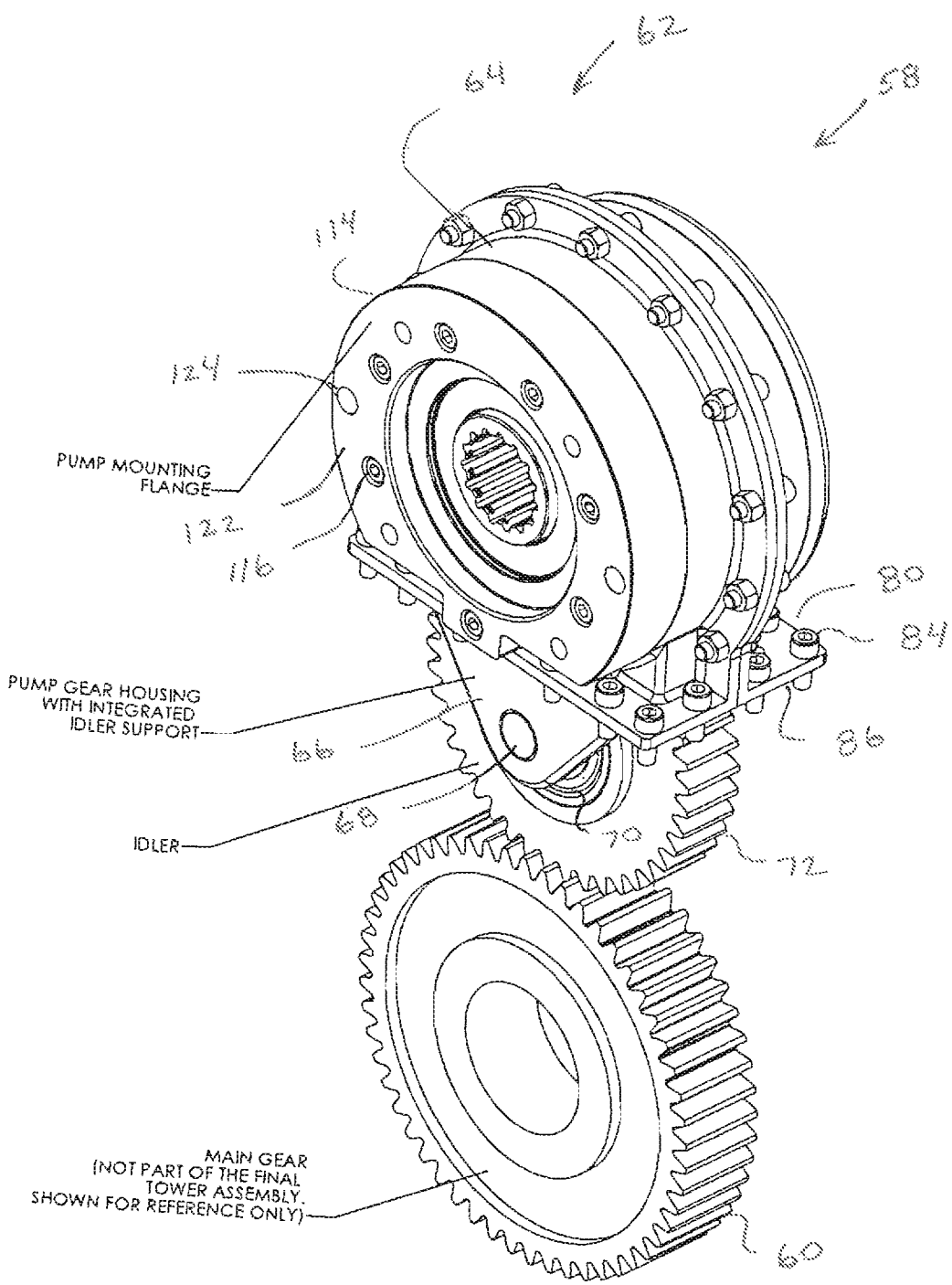
FIG. 3 is an isometric view of an exemplary drive coupler.
Figure 6:
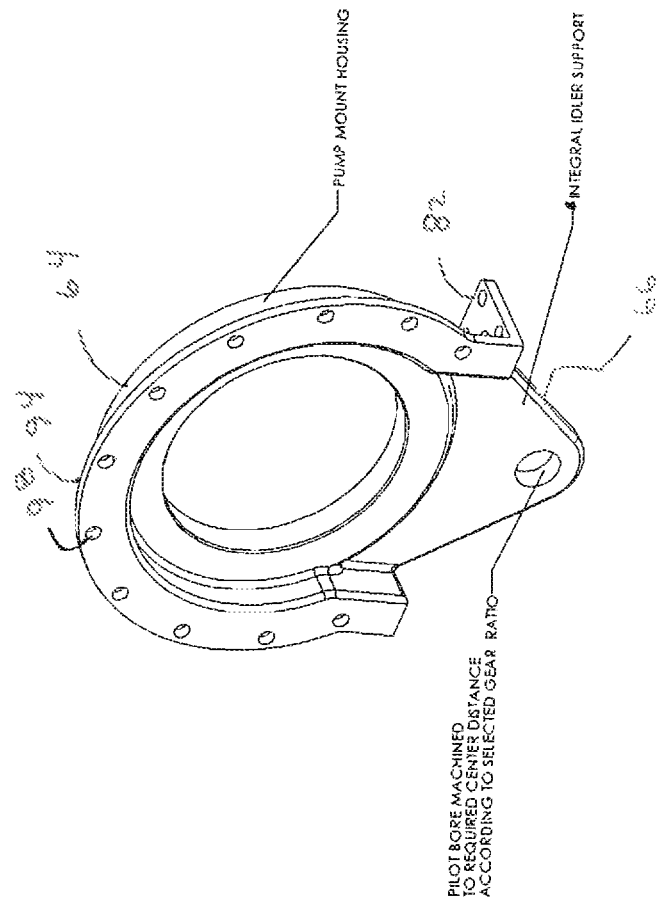
FIG. 6 is a rear isometric view of the exemplary coupler housing piece.
Figure 5:
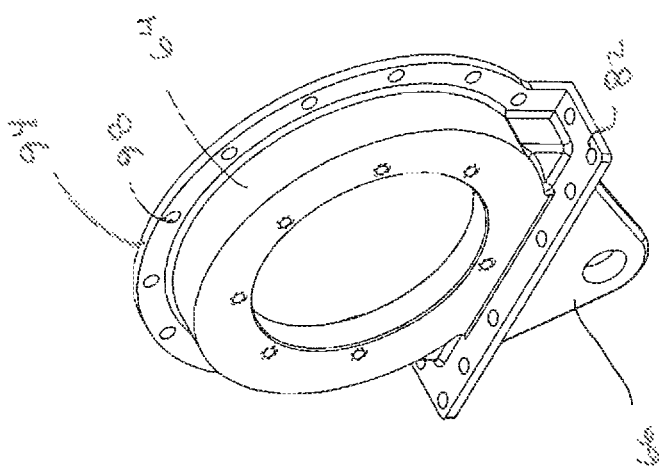
FIG. 5 is a front isometric view of a coupler housing piece.
Figure 7:
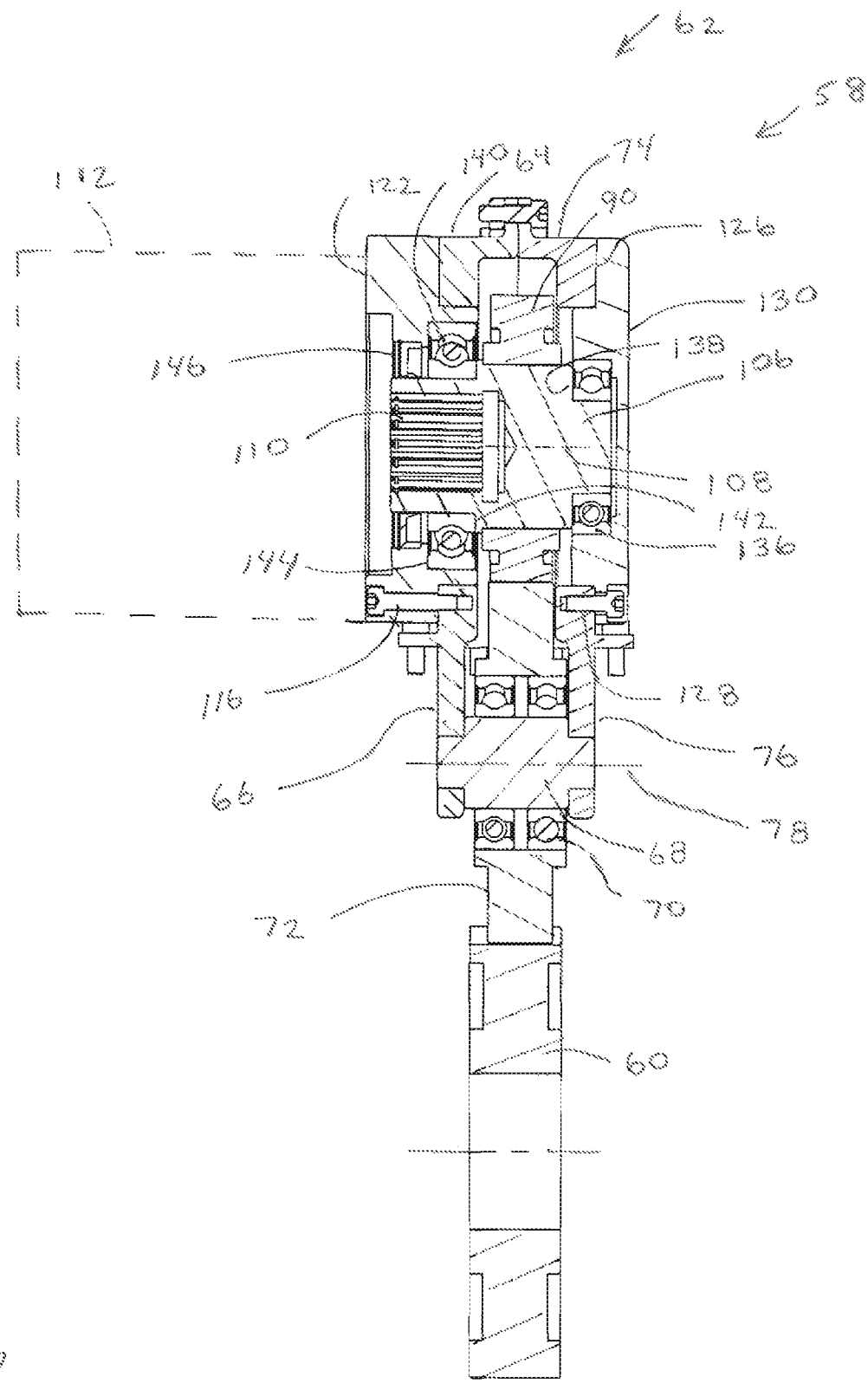
FIG. 7 is a cross-sectional view of an embodiment of a removable drive coupler.
Figure 9:
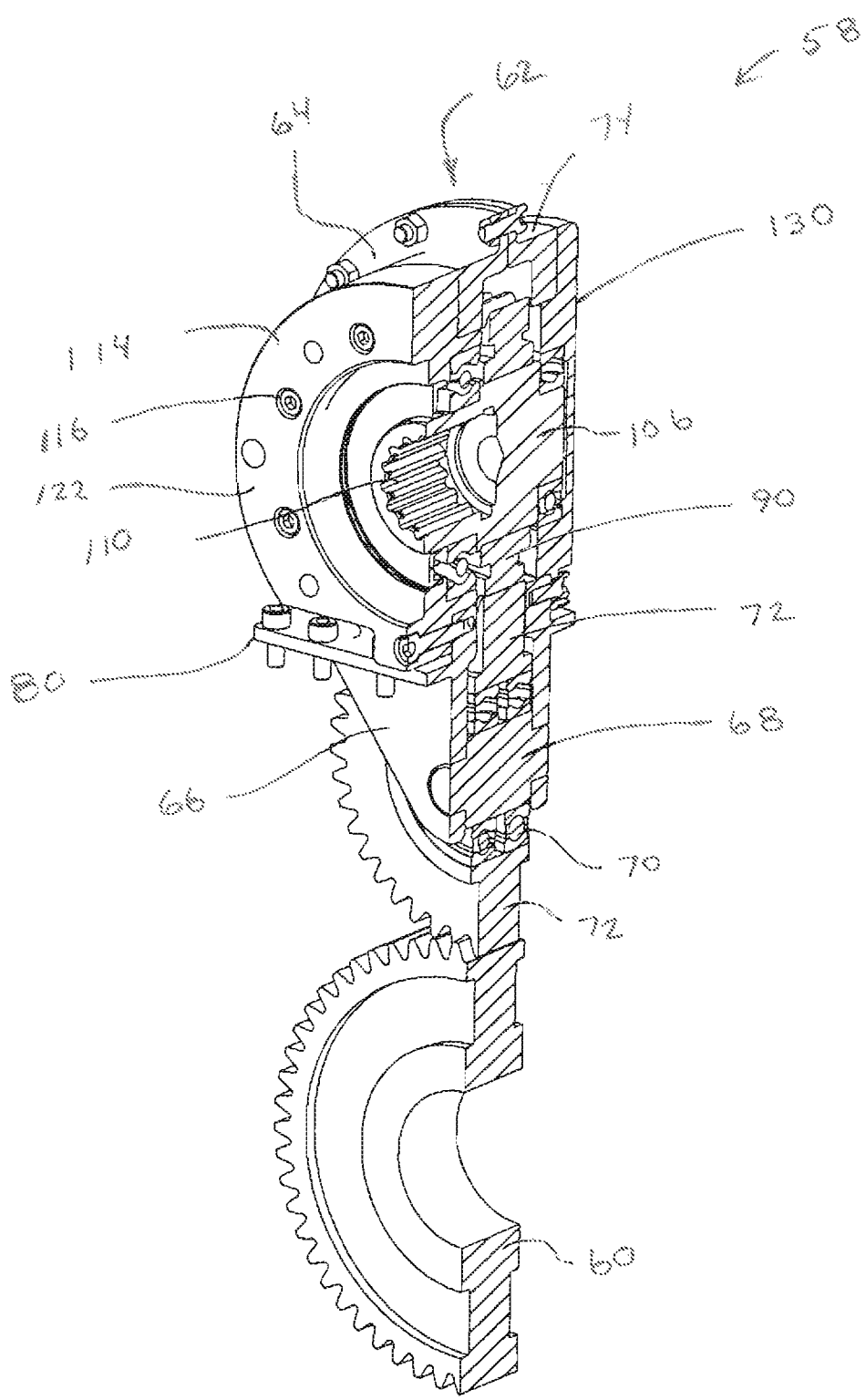
FIG. 9 is an isometric cross-sectional view of the drive coupler of FIG. 7.

An exemplary coupler 58 is shown in greater detail in FIG. 3. Coupler 58 is configured to transmit rotational power to or from at least one transmission gear within the gear box. In an exemplary embodiment the at least one transmission gear includes a ring gear 60. Ring gear 60 is positioned in an interior area of the gear box 16. Ring gear 60 is in operative connection with a drive shaft (not shown). In the exemplary arrangement of drive platform 10, the ring gear 60 rotates in operatively fixed rotational connection with the crank shaft or other driver member of an engine 12. The drive coupler 58 includes a housing generally indicated 62. The drive coupler housing is in operative connection with at least one drive coupler gear. The housing 62 of the exemplary embodiment of the coupler 58 is comprised of a plurality of components. Housing 62 includes a first housing piece 64. Housing piece 64 which is shown in greater detail in FIGS. 5 and 6 includes a idler support portion 66. The idler support portion 66 is in engaged relation with an idler shaft 68. The idler shaft is in engagement with bearings 70 (see FIG. 8) and with an idler gear 72.

Housing 62 further includes a further housing piece 74. Housing piece 74 also includes an idler support portion 76, which is similar to idler support portion 66 and includes an aperture that accepts the idler shaft 68. In the assembled condition of the drive coupler 58, the idler support portions 66 and 76 are disposed from one another along the direction of an axis 78 of the idler shaft 68 such that the idler gear 72 extends in intermediate relation thereof.

As shown in FIG. 3, the exemplary drive coupler 58 includes a rectangular base portion 80. Exemplary base portion 80 is configured to releasibly engage with the mounts adjacent the body openings. Exemplary base portion 80 includes a plurality of fastener accepting openings 82. Fastener accepting openings 82 are configured to be aligned with the pattern of the fastener accepting openings 50 in the mounting flange 46. A plurality of fasteners 84 are configured to extend through the fastener accepting openings 82 and engage the fastener accepting openings 50 in the body of the gear box. In the exemplary arrangement the base portion 80 has a planar lower base face 86 that is configured to be positioned in adjacent relation with the planar flange face 48 of a mounting flange 46. In some exemplary arrangements, the base face 86 may be in directly abutting engagement with the planar flange face 48. In other arrangements, shims or other spacers may be positioned between the base face 86 and flange face 48 for purposes of providing proper meshing engagement spacing of the ring gear 60 and the idler gear 72. Of course these approaches are exemplary and in other embodiments, other approaches may be used.

The exemplary housing pieces 64 and 74 are configured to bound a cavity 88. The cavity 88 is sized such that a coupling gear 90 is rotatable therein. The exemplary cavity 88 includes a base opening 92 thereto which enables the idler gear 72 to extend therethrough and engage the coupling gear 90.

In the exemplary arrangement, the housing pieces 64 and 74 are held in fixed releasible engagement through respective annular flange portions 94, 96. Flange portions 94 and 96 include apertures 98 and 100 respectively. A plurality of bolts 102 extend through apertures 98, 100 and engage nuts 104 so as to hold body pieces 64 and 74 in engagement. Of course it should be understood that this housing configuration and fastening approach is exemplary and in other embodiments, other approaches may be used.

In the exemplary arrangement, coupling gear 90 is releasibly held in fixed engagement with a hub 106. Hub 106 is releasibly engaged with coupling gear 90 via a slot and key arrangement. Alternatively in other arrangements, splines, projections, recesses, interfitting configurations, set screws, or other suitable engaging methods may be used.

In the exemplary arrangement, hub 106 is rotatable about an axis 108. Hub 106 further includes a shaft engaging recess 110. In the exemplary arrangement, the shaft engaging recess 110 is a splined recess that is suitable for engaging the shaft of a rotatable power device 112 which is shown in phantom. As previously discussed, the rotatable power device may include a pump, a motor or other type of device that utilizes power from or delivers rotatable power to the drive coupler 58 and the at least one transmission gear in operative connection therewith. Of course it should be understood that in other arrangements, other coupling approaches may be utilized for connecting the rotatable power device in operative rotatable engagement with the coupling gear 90.

In the exemplary embodiment of drive coupler 58, housing piece 64 is releasibly engaged with an annular device mounting portion 114. Device mounting portion 114 is releasibly engaged with housing piece 64 by fasteners 116 which extend through openings 118 in the device mounting portion and engage threaded openings 120 in housing piece 64. In the exemplary embodiment, the device mounting portion 114 includes a mounting face 122. In the exemplary arrangement the heads of fasteners 116 when in the engaged position are configured to lie below the surface of the flush mounting face 122.

In the exemplary arrangement, the device mounting portion includes a plurality of threaded openings 124. The threaded openings 124 provide a mounting face configuration that is suitable for accepting fasteners which are operative to hold a rotatable power device in engagement with the coupler housing 62. In exemplary arrangements, the mounting face configuration may include an arrangement of threaded openings that correspond to an SAE A, B, C, E or F mounting flange configuration. Such a mounting flange configuration may be utilized by hydraulic pumps or other devices which may be in operative connection with the drive coupler 58. Other exemplary mounting face configurations may correspond to the SAE J 744 standard, ISO pump mount flange standards, electric motor mount standards or other standard or non-standard configurations.

The exemplary body piece 74 of drive coupler 58 further includes a cover face 126. The cover face 126 is a generally annular planar cover face that includes a plurality of threaded openings 128. The cover face 126 is configured to engage a removable cover 130. Cover 130 includes a plurality of apertures 132 which are configured to be in alignment with threaded openings 128. A plurality of fasteners 134 extend through the apertures 132 and are releasibly engageable with the threaded openings 124. In the exemplary arrangement the cover 130 overlies the hub 106 on the side opposed of the shaft engaging recess 110.

The exemplary cover 130 is configured to be in operative engagement with a bearing 136. Hub 106 includes an annular step 138. The exemplary bearing 136 is positioned in abutting engagement with the annular step 138 and is held in intermediate relation between the cover 130 and the annular step 138.

A further bearing 140 is positioned on an opposed axial side of the hub from bearing 136. The hub 106 includes an annular step 142 against which the bearing 140 is positioned. The device mounting portion 114 further includes an annular recess 144 in which the bearing 140 extends. A seal 146 outwardly overlies the bearing 140 and includes a lip in relatively movable engagement with the hub 106. The seal 146 operates to minimize the infiltration of dirt or other contaminants into the interior of the drive coupler 58 so as to prolong the useful life thereof. Of course it should be understood that these components and configurations for the drive coupler are exemplary and in other arrangements, alternative structures and arrangements may be used.

A useful aspect of the exemplary drive coupler 58 is that it may be readily mounted in operative engagement with the gear box 16. Likewise the drive coupler may be readily operatively removed from engagement with the gear box.

In the exemplary arrangement to engage the drive coupler 58 and the gear box, a cover plate like cover plate 52 or 54 previously discussed, is removed from engagement with the gear box so as to expose the body opening such as body opening 44 where the drive coupler is to be positioned. This is accomplished by removing the bolts 56 that hold the cover plate in position.

Once the selected body opening is open, the drive coupler 58 is positioned in alignment with the opening and the idler gear 72 extended within the opening to engage the ring gear 60. In the exemplary arrangement, the planar flange face on the mounting flange of the gear box is in adjacent parallel relation with the planar base face of housing 62. In some exemplary arrangements, the base face 86 of the drive coupler may directly abut the planar flange face 48 of the mounting flange when the idler gear 72 in suitable meshing engagement with the ring gear 60. Alternatively in some arrangements, shims or other spacers may be positioned between the planar flange face and the planar base face so as to provide proper meshing engagement of the idler gear 72 and the ring gear 60. Once the desired spacing is determined, the fasteners 84 may be extended through the openings 82 in the base portion 80 to engage the threaded openings 50 in a mounting flange and tightened so as to hold the drive coupler 58 in fixed engagement therewith.

If it is desired to remove or reposition the drive coupler, the process can be reversed. In the exemplary arrangement, the body opening 44 may be closed by a cover plate or alternatively a different drive coupler may be extended in the opening to engage the ring gear.

In the exemplary modular drive arrangement, the gear box 16 includes a plurality of angularly spaced body openings so as to enable different types of drive couplers to be positioned in engagement therewith. Further the orientation of the drive couplers may also be changed so as to accommodate the particular drive arrangement that is desired. Further, the mounting of the drive couplers can be changed to modify the rotational direction of the rotatable power device. This facilitates having a suitable configuration for the drive and also making modifications.

Figure 4:
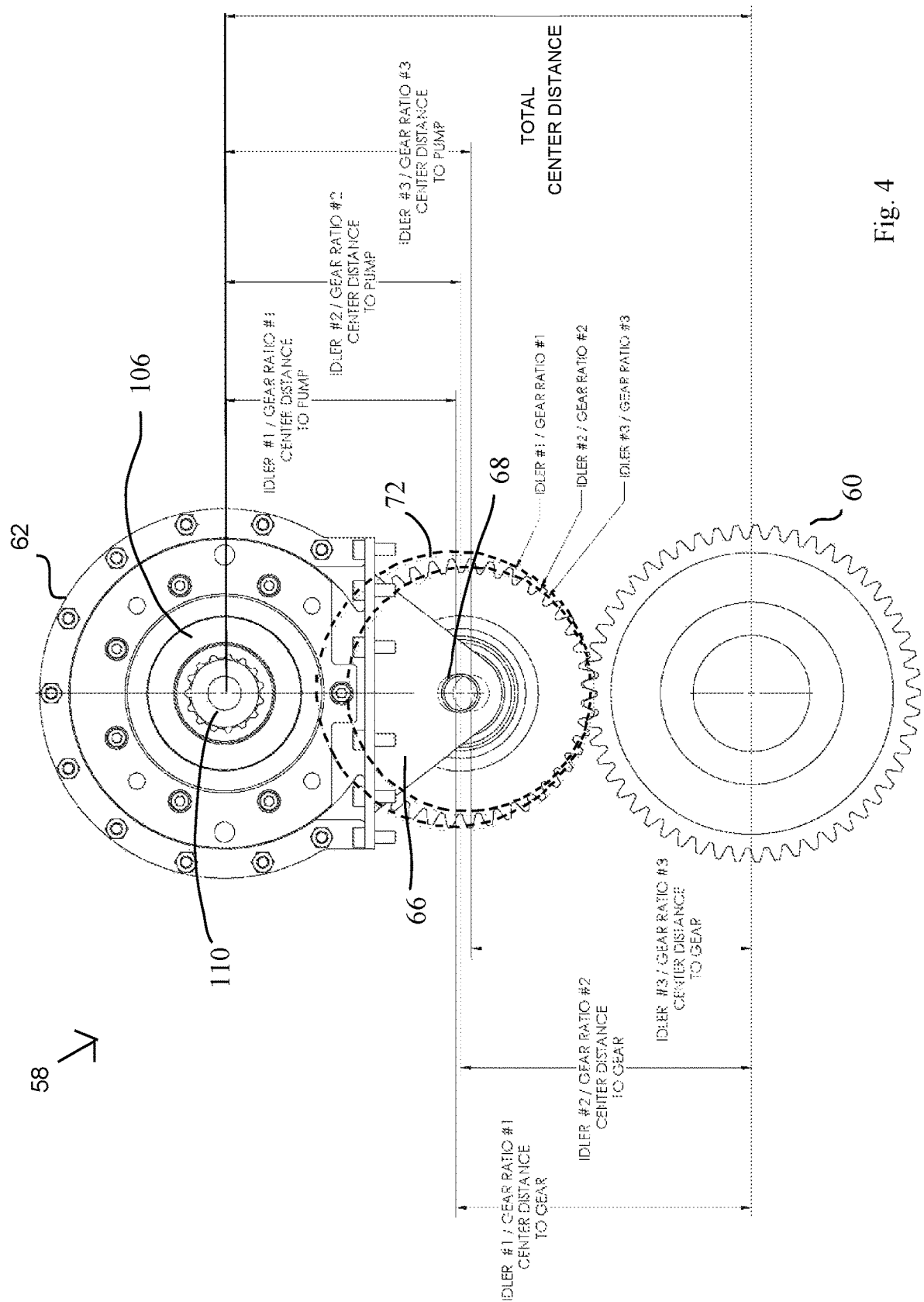
FIG. 4 is a front view of an exemplary drive coupler in operative engagement with a ring gear of a gear box.

A further useful aspect of some exemplary embodiments of the drive coupler described herein is that the drive coupler can be configured to have different rotational speeds relative to the ring gear 60. This is achieved in the exemplary arrangements because the idler support portions 66, 76 of the housing pieces are configured as triangular ears with sufficient length to enable the mounting locations of the idler shaft 68 to be varied. As shown in FIG. 4, varying the location of the idler shaft enables the use of different diameter idler gears 72 such that different drive couplers 58 may have different gear ratios. This varies the output speed of the hub 106 of the drive coupler. The exemplary housing structure 62 is enabled to be configured to have various gear ratios between the ring gear 60 in the gear box and the coupling gear 90. As a result, the relative speed of the rotatable power device and the ring gear 60 may be varied through the use of different idler gears. This further adds to the flexibility of the exemplary embodiment. Alternatively in other arrangements various types of transmission gears may be included in the gear box so as to enable drive couplers to be operatively connected through different gear ratios.

In addition, it should be pointed out that in the exemplary embodiment, the drive mounting portion 114 of the housing 62 can be changed. This is accomplished by disengaging the fasteners 116 which enables the mounting portion 114 to be disengaged from the housing piece 64. This enables a new drive mounting portion to be installed in engagement with the housing. Because the drive mounting portion 118 includes the mounting face 122 to which the rotatable power device is engaged, different types of devices with different mounting configurations can be engaged with the drive coupling. This includes, for example, devices with different sized SAE or other standard or non-standard mounting flange configurations. This enables the exemplary embodiment of the drive coupler 58 to be more readily adapted to different types of rotatable drive devices.

Further facilitating the configurability of the exemplary drive coupler is the fact that the housing pieces are separable and the hub is disengageable from the coupling gear. Thus for example, to reconfigure the drive coupler for use with a different type or size of engaging arrangement to engage a rotatable drive device, the hub 106 can be changed. For example if it is desired to change the rotatable drive device to a different type of device with a larger or smaller input shaft, the hub can be changed to provide a corresponding splined opening. Alternatively, if it is desired to change to a rotatable drive device to one that requires a different type of drive engaging configuration, an alternative hub can be utilized which includes such a drive configuration. Thus the exemplary arrangement provides numerous features that enable selectively configuring and adapting the drive coupler to numerous different types of rotatable power devices.

Figure 10:
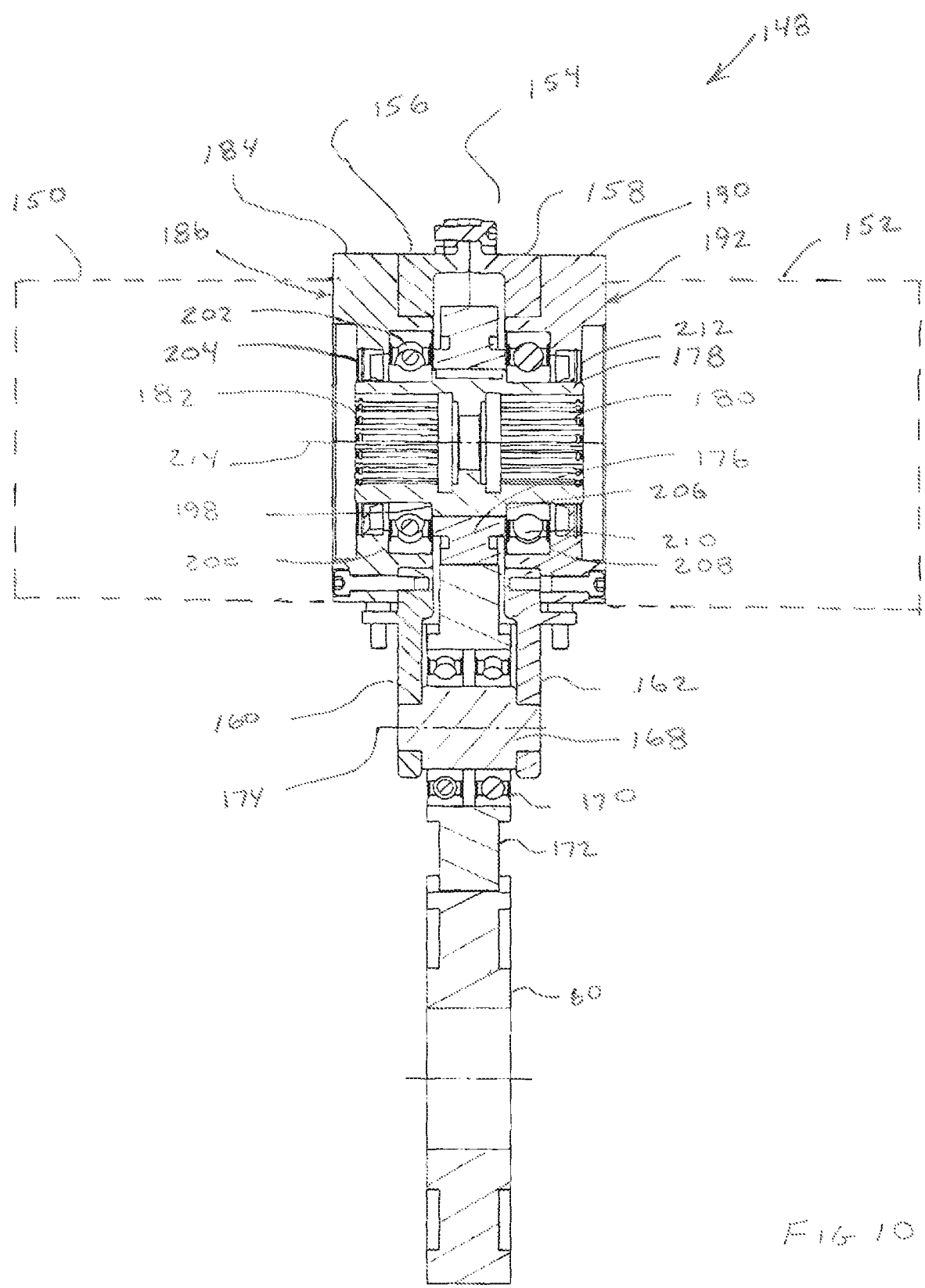
FIG. 10 is a cross-sectional view of an alternative embodiment of a drive coupler.
Figure 11:
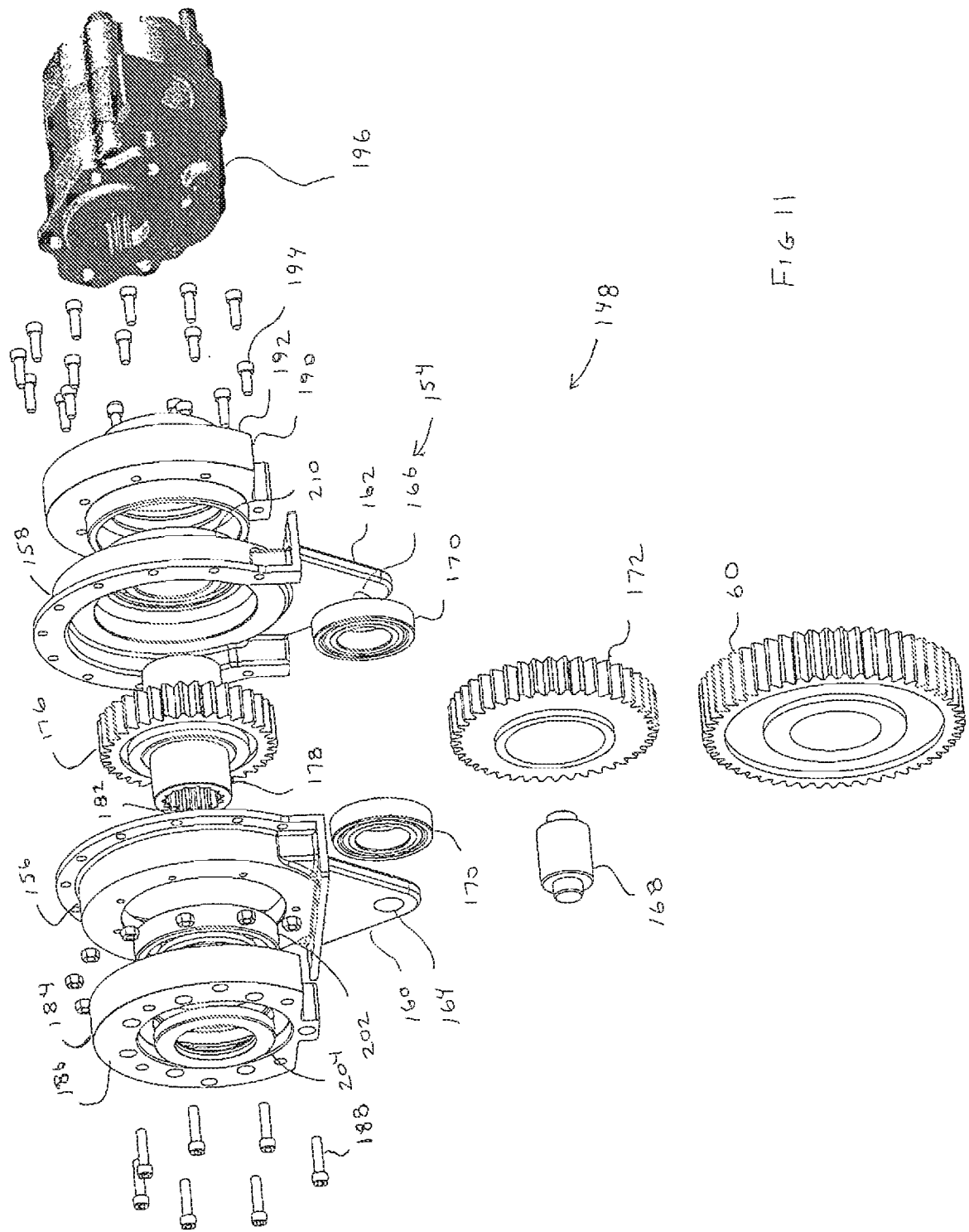
FIG. 11 is an isometric exploded view of the drive coupler of FIG. 10.

FIGS. 10 and 11 show an alternative embodiment of a drive coupler 148. This alternative drive coupler 148 includes many similar features to the drive coupler 58 but is configured to be in operative connection with two rotatable power devices 150, 152. Drive coupler 148 includes a housing 154 that includes a first housing piece 156 and a second housing piece 158. Each of the housing pieces 156 and 158 of housing 154 are generally similar to housing piece 64 previously described. In this exemplary embodiment both of the housing pieces are identical. Each of the housing pieces 156 and 158 include idler support portions 160 and 162 respectively which are each in the shape of triangular ears. Each of the idler support portions includes a shaft accepting opening 164, 166 for accepting an idler shaft 168 therein. Like the previous embodiment, housing 154 is adapted to enable the idler shaft to be positioned in different locations so as to provide different gear ratios for the rotatable power devices.

Similar to the previously described embodiment, drive coupler 148 includes a pair of bearings 170 which support an idler gear 172 on the idler shaft 168. The idler shaft is rotatable about an axis 174. As with the prior embodiment, the idler support portions are configured as triangular shaped ears which enable the axis 174 of the idler shaft to be positioned in different locations so as to provide different gear ratios for the drive coupler arrangement. This is accomplished by changing the location of the axis of rotation of the idler gear 172 and the size of the idler gear.

Drive coupler 148 further includes a coupling gear 176. The coupling gear 176 is in meshing engagement with the idler gear 172. The coupling gear 176 is releasibly engageable with a hub 178. Hub 178 includes an opposed pair of shaft engaging recesses 180, 182. In the exemplary arrangement the shaft engaging recesses 180 and 182 are splined recesses that are configured to each engage a respective shaft of a rotatable power device. Of course it should be appreciated that in other embodiments, other types of engagement structures may be used for rotatably engaging the rotating member of such devices.

Drive coupler 148 further includes a drive mounting portion 184 which includes a mounting face 186. Similar to the previously described embodiment, drive mounting portion 184 is releasibly engageable with the housing piece 156 through fasteners 188. The fasteners extend through openings in the drive mounting portion and engage threaded openings in the housing piece 156 in a manner like that described in connection with the previous embodiment. The mounting face 186 also includes a face configuration including a plurality of threaded openings for accepting fasteners which can be utilized to mount thereto a rotatable power device. As with the previous embodiment, the mounting face configuration may correspond to a flange configuration of devices having an SAE or other standard or non-standard flange configuration. Of course it should be understood that other types of mounting configurations may be used.

Drive coupler 148 further includes a drive mounting portion 190 which in the exemplary arrangement, has a structure similar to drive mounting portion 184. Drive mounting portion 190 includes a mounting face 192. The drive mounting portion is in releasible engagement with the housing piece 158 through fasteners 194 in a manner like that previously described for the other drive mounting portion. The mounting face 192 of drive mounting portion 184 may be configured to have various openings or coupling devices so as to facilitate the mounting of rotatable power devices thereto. In FIG. 11, an exemplary rotatable power device in the form of a hydraulic pump 196 is shown. The face flange configuration of pump 196 which is an SAE B configuration, is exemplary of numerous different types of face configurations that the mounting faces of the drive mounting portions may be configured to engage.

Hub 178 includes a first annular step 198. Drive mounting portion 184 includes a recess 200. A bearing 202 is positioned in engagement with the step in the recess 200. A seal 204 is positioned to prevent the infiltration of dirt to the bearing 202 and the interior cavity of the housing 154.

Hub 178 further has an annular step 206 and drive mounting portion 190 includes an annular recess 208. A bearing 210 is positioned in abutting engagement with the annular step 206 and extends in the recess 208. A seal 212 is positioned to prevent the infiltration of dirt and other contaminants to the bearing 210. The exemplary arrangement with seals 204 and 212 enable the rotation of the hub 178 and the coupling gear 176 about an axis 214.

As can be appreciated, the exemplary alternative drive coupler 148 enables the connection of two rotatable power devices in operative rotatable engagement with the drive coupling. Further, the arrangement enables the rotatable drive devices to move in opposite rotational directions depending on the side of the coupler device to which the rotatable power device is mounted.

The exemplary rotatable coupler devices are useful for arrangements that include rotatable power devices that are driven by the driver such as the engine. Such devices may include hydraulic pumps, generators, air compressors, water pumps or other suitable driven devices. Further in exemplary arrangements, the rotatable power devices may include driver devices such as electric, hydraulic or other types of motors. Such motors may be utilized in exemplary arrangements to provide a hybrid drive arrangement or an electric drive arrangement for the particular drive platform. For example in some exemplary embodiments, a plurality of electric motors may be connected to the drive couplings of the gear box. Electric motors may be suitable for driving the driven device or devices which cause the vehicle or other item that is to be driven, while the other available driver such as an engine is disconnected from the gear box through a clutch or similar device.

In other exemplary arrangements, the driver devices such as electric motors or hydraulic motors may comprise the primary driver device of the platform. In such arrangements alternative drivers such as internal combustion engines may not be present. Such driver devices may be arranged on the modular drive gear box such that different numbers of driver devices can be engaged to vary the amount of driving force that is applied so as to correspond to the need for power at a particular time. Thus for example a plurality of driver motors may be operatively connected through drive couplers to the gear box. Different numbers of motors may be operational to deliver power as required by the particular circumstances being encountered by the drive platform. Thus the amount of power can be selectively varied as needed during operation of the device. Alternatively or in addition, different drive devices may have different rotational speeds. Under some circumstances, driver motors may have a relatively lower rotational speed but a relatively high torque while other motors may have a relatively lower torque but a higher speed. Under certain circumstances when different motors having these characteristics are in operative connection with the drive couplers and the gear box, the drive platform may be driven at a relatively lower speed at a high torque when necessary, as well as at a higher speed but at a somewhat lower torque under other circumstances. Of course it should be understood that these approaches are exemplary and in other arrangements, other approaches may be used.

In the exemplary embodiment the gear box is shown with a central ring gear 60 which engages the one or more idler gears 172 of the drive couplers. In other arrangements, the gear box may include other types of internal transmission gears such as planetary gears or other gear sets so as to enable driving the idler gears in connection with the transmission gears at different speeds. Alternatively in other arrangements, the gear box may include a plurality of different ring gears that are axially disposed within the gear box. The mounting flanges of the gear box may include different mounting positions so as to selectively enable the drive couplers to be positioned so as to selectively engage the different gears. Alternatively or in addition, different gear boxes may include ring gears of different diameters and different mounting flange structures or similar mounting structures so as to use drive couplers with idler gears that extend inwardly in the gear box different distances to selectively engage the different ring gears. In some arrangements gear boxes may be included on different sides or on both sides of an engine or other driver. Of course these configurations are exemplary and numerous different configurations may utilize the principles described herein.

Further it should be understood that although in the exemplary embodiments the drive couplers are shown with one or two mounting faces that are configured to enable the operative rotational engagement of rotatable power devices, alternative embodiments may include different configurations that enable the connection of different numbers of rotatable power devices. For example drive coupler devices may be configured to be in operative rotatable connection with more than two rotatable power devices. Further, alternative arrangements may include gearing and other structures so as to enable different rotatable power devices connected to a single drive coupler to rotate at different speeds. Alternative drive couplers may also include transmission devices or clutches so as to enable selectively disengaging and/or changing the speeds of the engaged rotatable power devices. Alternatively or in addition, drive couplers may include fluid couplings or torque limiting couplings so as to provide slippage or to limit the maximum transmitted torque so as to avoid damage to the drive couplers or the connected rotatable power devices. Of course these approaches are exemplary of numerous different configurations that may utilize the principles described herein.

FIGS. 12 through 18 show alternative arrangements in which a modular drive is utilized as part of a system which provides a hybrid drive for driven devices. The hybrid drive may be used in conjunction with driven devices such as propellers of a ship as previously discussed or alternatively other types of driven devices that are utilized to selectively deliver mechanical power.

Figure 12:
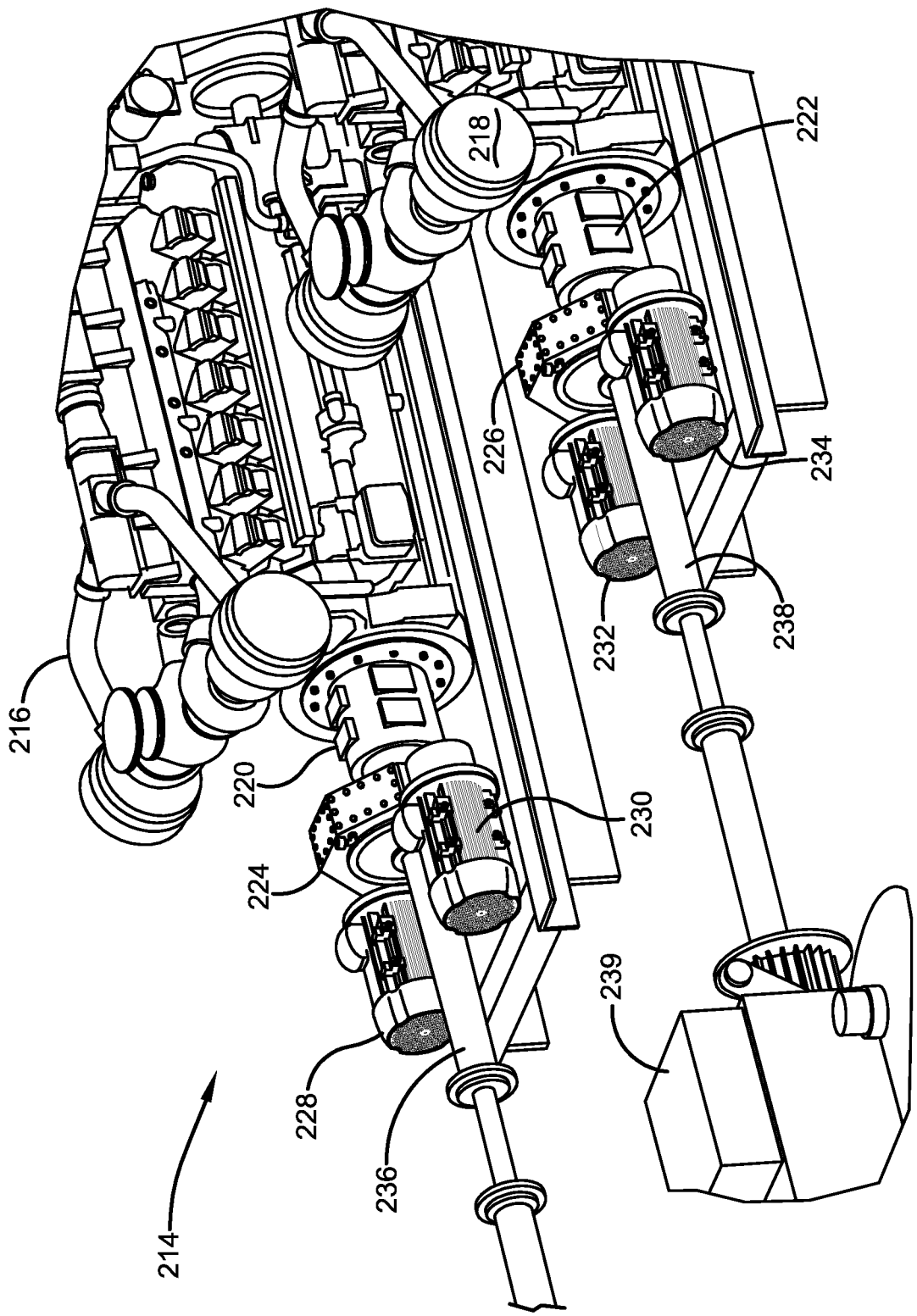
FIG. 12 is an isometric view of an exemplary embodiment including the modular drive in a hybrid drive arrangement.

FIG. 12 shows a portion of a drive platform 214. Drive platform 214 is similar to previously described drive platform 10. Drive platform 214 includes two internal combustion engines 216, 218. Each internal combustion engine is connected to a respective clutch 220, 222. The clutches may be of the hydraulic or pneumatic type and may include features like those described in the incorporated disclosure.

In the exemplary arrangement, each clutch is in operative connection with a modular drive gear box 224, 226. In the exemplary arrangement shown, the modular drive gear boxes may be similar to those previously described. In the exemplary arrangement each modular drive gear box includes drive couplers that are in operative connection with rotatable power devices 228, 230; 232, 234. In exemplary arrangements the rotatable power devices include electric motor generators as later discussed.

Each modular drive gear box 224, 226 is in operative connection with an output shaft 236, 238. In the exemplary arrangement, each output shaft is in operative connection with a thruster such as those previously described 237, 239.

Figure 16:
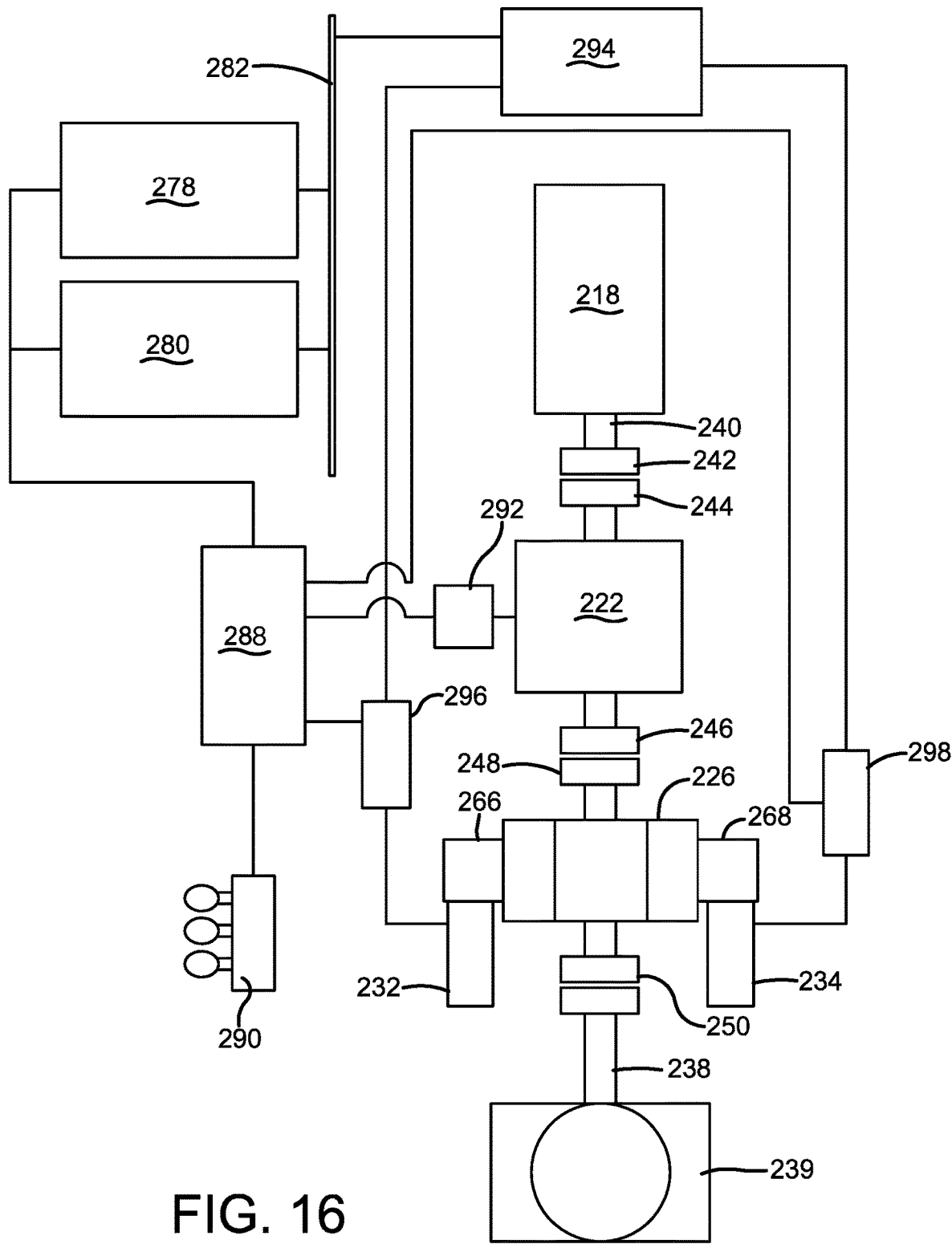
FIG. 16 is a schematic view of a portion of an exemplary hybrid drive that utilizes the modular drive.

As shown schematically in FIG. 16, the exemplary drive platform includes a pair of internal combustion engines and modular drive arrangements that are generally similar. As a result, only one of the engine and drive pairs will be described in detail.

As represented in FIG. 16, internal combustion engine 218 may comprise a gas or diesel engine that drives a crankshaft thereof and outputs rotational power through an output shaft 240 and an output hub schematically indicated 242. In exemplary arrangements, a hub may include a shaft, disc, plate or other rotatable member through which rotational power can be transmitted. As numerous different hub arrangements may be provided in different embodiments, all such arrangements are represented schematically in FIG. 16.

The output hub 242 of the engine is operatively connected to a clutch input hub 244. The engine output hub 242 and clutch input hub 244 may be operatively connected through a coupling or other suitable arrangement such as drive shafts, vibration dampers or the like as discussed in connection with previously described embodiments.

As explained in detail in the incorporated disclosures, a clutch such as clutch 222 is selectively operative to operatively rotationally engage the clutch input hub 244 and the clutch output hub 246. As a result in this exemplary arrangement, the clutch 222 is enabled to selectively engage and disengage the engine 218 from the drive components that are downstream of the clutch. Further as can be appreciated, exemplary arrangements may include other items that are driven through operation of the engine 218. These may include, for example, pumps as discussed in the previously described arrangement. Thus the configuration of the exemplary embodiment shown in FIG. 16 enables the engine 218 to be used to selectively drive other devices such as the pump while disengaged from the modular drive gear box 226 and driven members such as the thruster 239.

The exemplary modular drive gear box 226 includes a drive input hub 248. The drive input hub is in operative connection with the clutch output hub 246 through a suitable coupler or other device that transmits the rotational power delivered by the clutch. The drive input hub 248 is in operative connection with the at least one transmission gear within the modular drive gear box 226. The gear box includes a drive output hub 250. The drive output hub 250 is in operative connection through a suitable hub or other drive coupler with the output shaft 238 that drives the thruster 239. Of course it should be understood that this approach is exemplary and in other embodiments, other approaches may be used.

Figure 15:
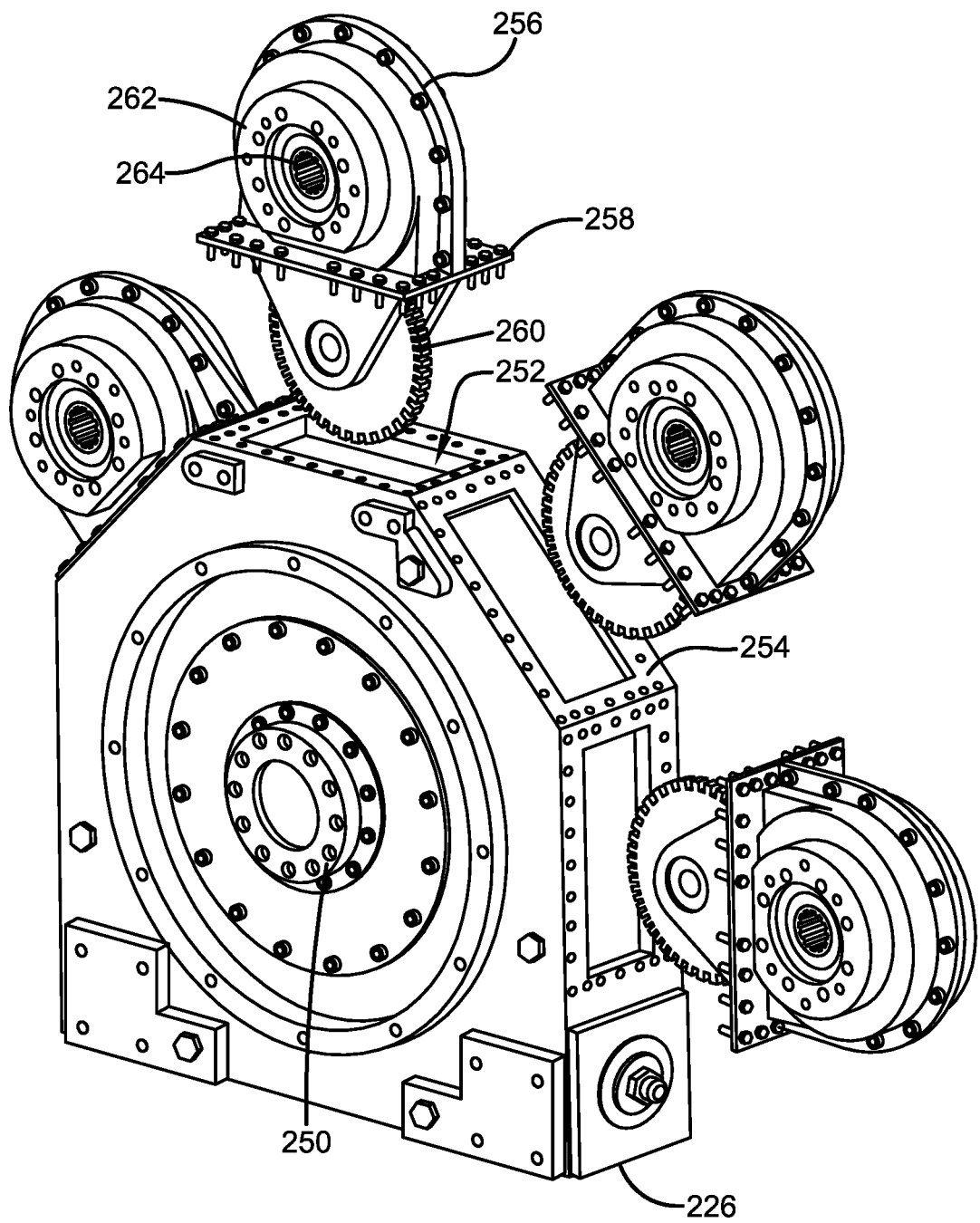
FIG. 15 is an isometric exploded view of an exemplary modular drive and a plurality of drive couplers.

The exemplary modular drive gear box used in this exemplary embodiment is generally similar to the modular drive gear box 16 previously discussed. As represented in FIG. 15, the gear box includes a plurality of angularly disposed body openings 252 that extend into an interior area of the gear box. Each mounting opening 252 includes a mount which includes a flange 254 extending adjacent thereto. As in the previously discussed embodiment, each of the flanges includes therein a plurality of threaded openings suitable for accepting fasteners therein. Each of the flanges of the exemplary arrangement is configured to be operatively engaged with a base portion of a drive coupler or a cover plate in the case where the body opening is not used in connection with a drive coupler.

As shown in FIG. 15, drive couplers 256 similar to those previously described may be operatively connected to the gear box 226. As in the previously described arrangement, each drive coupler includes a base portion 258 that is configured to be positioned adjacent to a body opening. Each base portion 258 includes a plurality of openings for fasteners that can be extended therethrough to engage the threaded openings in a respective drive flange 254. Similar to the previously described drive couplers, the drive couplers used in this alternative embodiment include at least one drive coupler gear 260. The drive coupler gear is configured to extend in a respective body opening to engage at least one transmission gear within the gear box. The at least one drive coupler gear enables mechanical rotational power to be transmitted from the at least one transmission gear to a rotatable power device in operative connection with the respective coupler, and/or power to be transmitted from the rotational power device connected to the drive coupler to the at least one transmission gear within the gear box.

The exemplary drive couplers further include a respective mounting face 262 on each housing. The mounting face is configured for engagement with the type of rotatable power device that is to be operatively connected with the particular drive coupler. The drive coupler further includes a hub 264 which is suitable for engaged rotational connection with the rotatable power device that is operatively connected to the drive coupler. In exemplary arrangements the hub may include a splined opening similar to that discussed in connection with prior drive couplers. Alternatively, the hub of the coupler may include a suitable shaft, disc, plate or other rotatable member that can be used to operatively connect the drive coupler and the rotational power device.

Although in the exemplary arrangement shown in FIG. 15, five drive couplers may be in operative connection with the modular drive gear box, in other arrangements other numbers and configurations of drive couplers may be used. Further as can be appreciated, other types of drive couplers such as those previously discussed, may also be utilized in connection with exemplary arrangements which employ the principles that are described herein.

Figure 13:
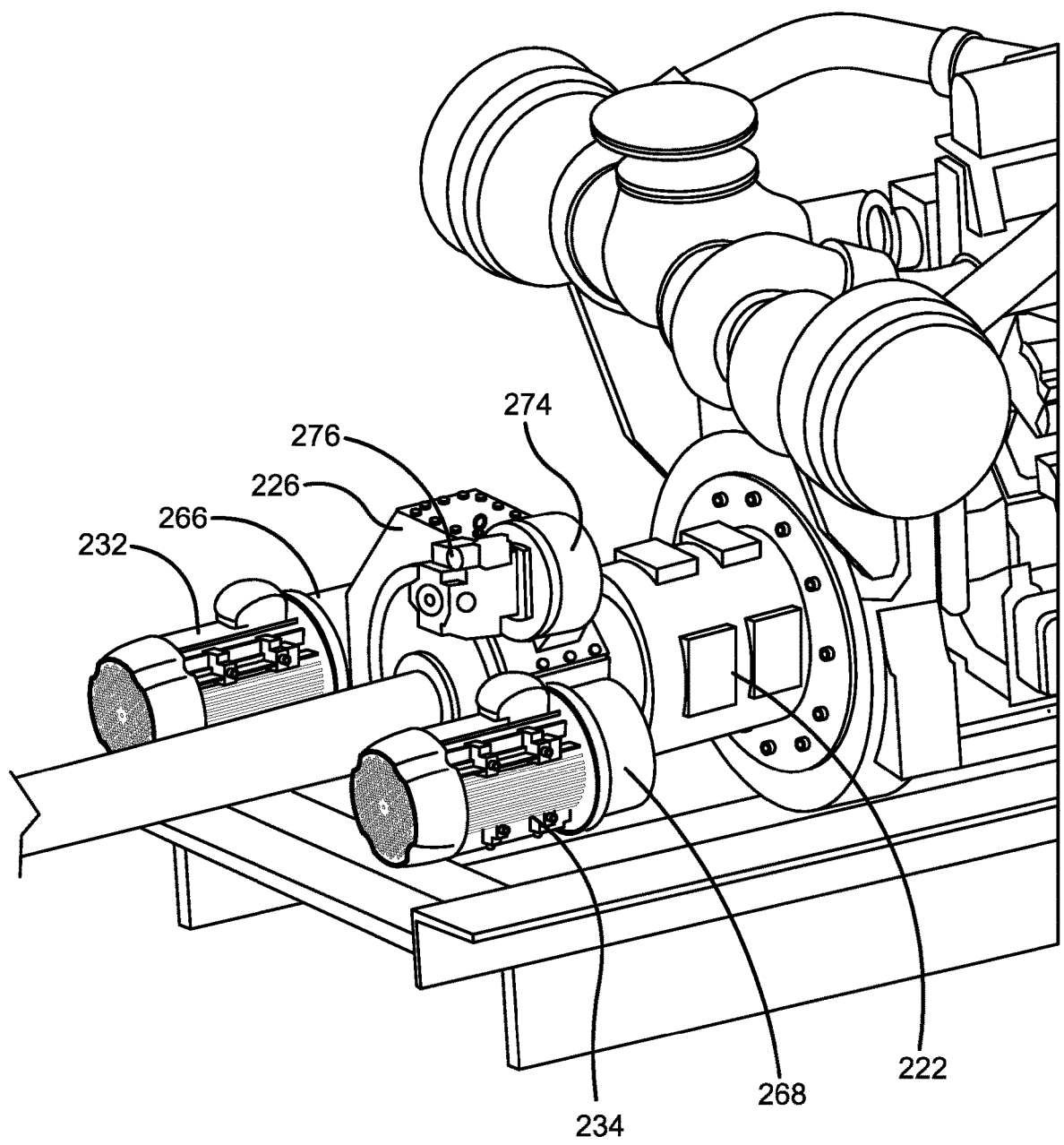
FIG. 13 is an enlarged view of the modular drive operated in the arrangement of FIG. 12.
Figure 14:
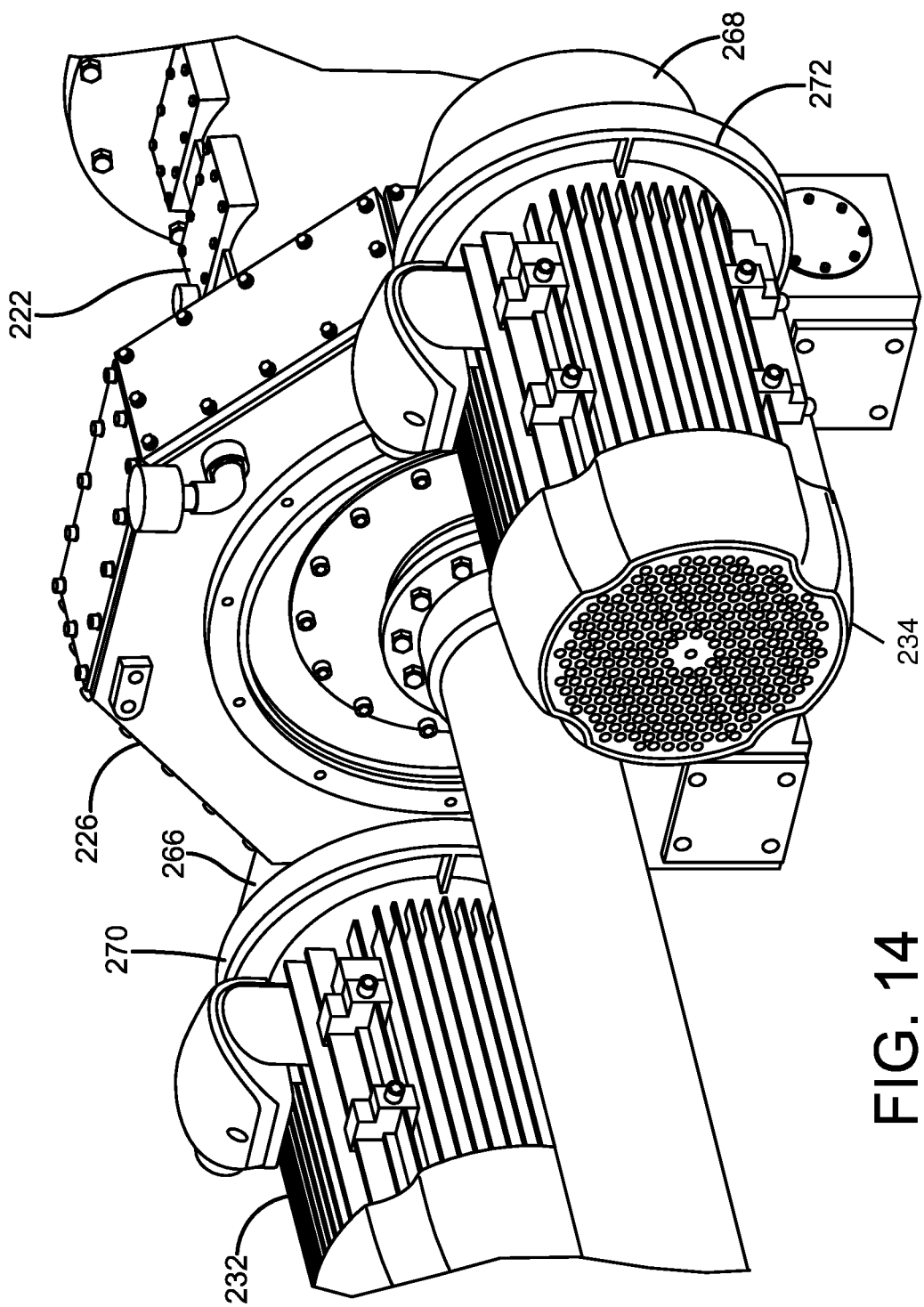
FIG. 14 is an enlarged view of the hybrid drive engaged with two rotatable power devices.

As represented in FIGS. 13 and 14 in the exemplary embodiment each modular drive gear box includes two drive couplers positioned at generally horizontally opposed positions in connection with the gear box. For example as shown in FIGS. 13 and 14, drive couplers 266 and 268 are mounted in operative connection with gear box 226. Each motor generator 232, 234 is operatively connected to the respective drive coupler 266, 268 through coupler members 270, 272 which operatively connect the respective motor generator and the drive coupler. In exemplary arrangements, the coupler members 270, 272 may include vibration dampers or other suitable features which serve to operatively connect the respective rotatable power device and the mounting face of the respective drive coupler in a suitable manner.

Further as represented in FIG. 13, exemplary arrangements may include one or more additional drive couplers which are connected to the gear box in a manner like that previously described. FIG. 13 shows an additional drive coupler 274. Drive coupler 274 may be similar to the drive couplers previously described. The drive coupler 274 may be operative to operatively connect the at least one transmission gear of the modular drive with a rotatable power device such as a hydraulic pump 276 or other device which either consumes mechanical power or delivers rotational mechanical power. Of course it should be understood that the arrangements shown are exemplary and in other arrangements, different arrangements of rotatable power devices may be used.

In the exemplary arrangement, the motor generators 232, 234 comprise electrical motor generators that may be selectively operative to at different times consume mechanical power that is delivered from the at least one transmission gear within the gear box 226, as well as to deliver mechanical power to the at least one transmission gear in the gear box. In the exemplary arrangement, the motor generators include electrical motor generators that when driven by the delivery of electrical power thereto from an electrical power delivery source, drives the rotational power device to deliver mechanical power. The mechanical power produced is operatively delivered through the respective drive coupler to the at least one transmission gear within the gear box. Thus the rotational mechanical power provided by the motor generators operating in a motor mode provide power that can be used to drive the connected thruster or other driven device.

Alternatively when the electric motor generators are operated in a generator mode, the engines can be utilized to produce mechanical power that is consumed by the motor generators operating in a generator mode. In the generator mode, the electrical power produced by the rotational power devices can be delivered to one or more electrical power consuming devices which may be operated on the ship or other device in which the exemplary system may be used.

It should be appreciated that in exemplary embodiments, the motor generators may be used to provide supplemental power in addition to power provided by the engine when the engine and the rotatable power devices operating in a mechanical power delivery mode both operate to deliver power to the driven member. Alternatively in other arrangements, the clutch 222 may be utilized to operatively disconnect the engine 218 from the modular drive gear box 226. In such arrangements, one or more of the rotatable power devices operating in a power delivery mode may be utilized to operate the driven devices. Further it should be appreciated that in other embodiments, additional clutches or similar mechanisms may be included in the drive platform. This may enable, for example, the driven device 239 to be operatively disconnected from the output shaft 238 in a manner similar to that discussed in connection with prior embodiments. Thus for example in such arrangements, the rotational power devices operating in a mechanical power delivery mode may be utilized to perform functions such as to drive other rotatable power devices in operative connection with the modular drive, turn the engine for purposes of starting the engine, or other functions or accomplish other activities.

Further it should be appreciated that while in exemplary arrangements electrical motor generators are discussed, in other arrangements other types of motor generators may be used. For example in some exemplary arrangements, hydraulic motor generators may be utilized in conjunction with a working fluid to store energy in the form of fluid pressure in a device such as a hydraulic accumulator. The hydraulic accumulator may store the energy as the motor generator operates in a generator mode. Thereafter when the accumulated energy is to be utilized, the fluid pressure within the accumulator may be directed through appropriate valving or other controls to the motor generator operating in a motor mode. In such a mode, the motor generator may utilize the energy of the fluid passing therethrough so as to deliver rotational power to the at least one transmission gear. Of course it should be understood that these approaches are merely exemplary of many that may be utilized in connection with systems that employ the principles and features described herein.

Figure 17:
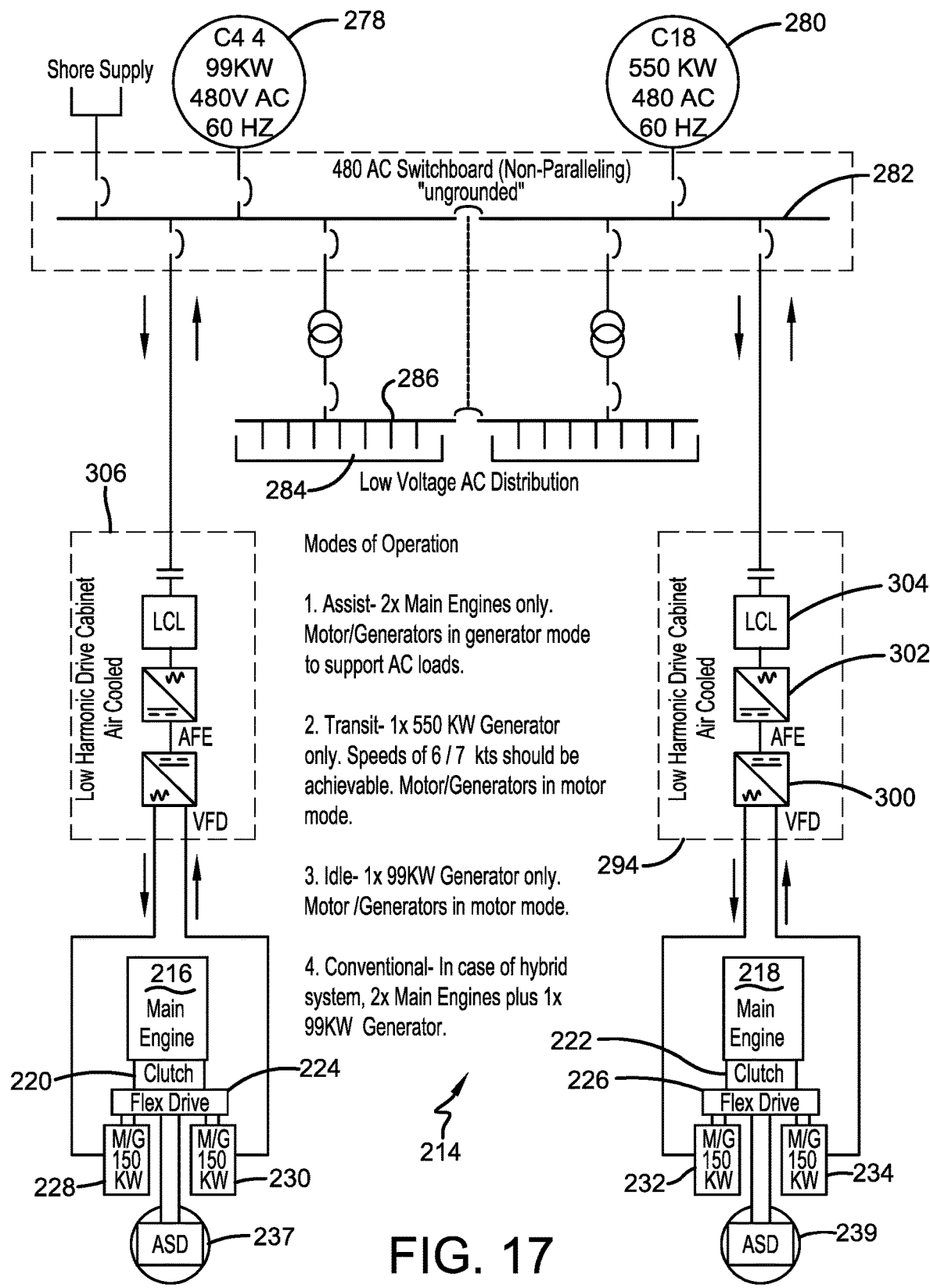
FIG. 17 is an electrical schematic representing operational modes of an exemplary embodiment.

FIG. 16 shows a schematic view of a control system associated with an exemplary embodiment of a hybrid drive arrangement. In the exemplary embodiment, electrical power delivery sources 278, 280 are in operative connection with an electrical distribution bus 282 or similar electrical distribution switchboard. In exemplary embodiments as represented in FIG. 17, the electrical power delivery sources include electrical generators such as diesel electric generators. Of course it should be understood that in other arrangements, the electrical power delivery source may include other types of sources such as battery packs or other suitable devices for delivering electrical power.

In the exemplary arrangement represented in FIG. 17, it should be noted that the electrical distribution bus 282 is also connected to electrical power consuming devices represented 284. In the exemplary arrangement, the electrical power consuming devices include devices that are utilized in connection with the ship or other device in which the exemplary system is used. As shown in the exemplary arrangement, the electrical power consuming devices are operatively connected through an electrical distribution bus 286. Electrical bus 286 may in some exemplary arrangements be a lower voltage distribution bus than bus 282. For example in exemplary arrangements, bus 282 may be a 480 volt AC bus whereas bus 286 may be a 110 AC or 220 AC distribution bus. Of course it should be understood that these approaches are exemplary and in other arrangements other approaches may be used.

It should also be understood that in exemplary embodiments where the electrical power delivery source includes one or more battery packs, the battery packs may function as an electrical power delivery source when they are providing power. Such battery packs may also selectively operate as an electrical power consuming device when the battery packs are being recharged such as by electrical power delivered from the motor generators operating in a generator mode.

In the exemplary embodiment, at least one control circuit 288 is in operative connection with the components of the hybrid drive system for purposes of providing the control thereof. In an exemplary arrangement, at least one control circuit may include suitable processors, integrated circuits or other circuitry which is suitable for controlling the components which comprise the system. The at least one electrical control circuit 288 is in operative connection with one or more operator panels 290. The operator panel 290 provides suitable input and output devices that enable an operator of the ship or other system in which the control circuitry is used, to control the different functions associated with operation of the components. It should be understood that although the control circuitry is shown in operative connection with the modular drive and other components that are associated with gear box 226, the control circuitry may be operative to control the drive train associated with both engines 216 and 218 and modular drives 224 and 226.

In the exemplary embodiment, the control circuitry is in operative connection through an interface 292 with the clutch 222. In exemplary arrangements, the interface 292 may be operative to deliver and relieve hydraulic pressure or otherwise control the engagement and disengagement of the clutch 222.

The exemplary control circuit is also in operative connection with a control panel 294. The control panel 294 is in operative connection with each of electrical motor generators 232 and 234 through suitable switching interfaces 296 and 298 respectively. The exemplary control circuit is also in operative connection with each of the switching interfaces 296 and 298.

As represented in FIG. 17, the electrical control panel 294 includes a number of operational components which enable the electrical motor generators to operate selectively in a driving mode in which they deliver rotational mechanical power to the at least one transmission gear of the modular drive, or alternatively in a power consuming mode in which they consume mechanical power from the at least one transmission gear of the modular drive and produce electrical power which can then be delivered to power consuming devices.

In the exemplary arrangement, control panel 294 includes a variable frequency drive 300. In the exemplary arrangement, the variable frequency drive comprises a low harmonic drive which is suitable for effectively driving the rotatable power devices in a power delivery mode. The variable frequency drive is operative to control the speed and mechanical energy delivered by each of the motor generator devices 232 and 234 operating in a motor mode.

The exemplary control panel further includes serial active filter components 302. Serial active filter components serve as an active front end to mitigate harmonics of the frequencies delivered through operation of the variable frequency drive 300.

Further the exemplary control panel 294 includes at least one LCL filter. The LCL filter may be utilized in connection with the motor generators operating in the generator mode. The LCL filters may be operated to smooth the output currents generated by the motor generators to facilitate their interconnection to the bus 282. LCL filters 304 may also be utilized in connection with power delivery from the bus 282 for purposes of assuring consistency of the current that is delivered for use in connection with operating the motor generators to drive the at least one transmission gear as well. In the exemplary arrangement, the control panel 306 which is similar to control panel 294 is used to deliver electrical power to and to receive electrical power from motor generators 228 and 230 which are used in connection with modular drive 224 and engine 216. Of course it should be understood that these particular electrical components and functions are exemplary and in other embodiments, other components, functions and devices may be used for purposes of controlling the delivery and receipt of electrical power.

In exemplary embodiments, the at least one control circuit responsive to the inputs of a user through operator panel 290 may operate the drive platform 214 in a number of different modes. For example, in the exemplary arrangement shown in FIG. 17, electrical generator 278 has a lower power rating than electrical generator 280. In this arrangement, the differences in the power available from the different generators enables the system to be operated in a number of different modes. For example, the operator of the operator panel 290 is enabled to operate the drive platform in a first mode in which the internal combustion engines 216 and 218 provide all the mechanical power for driving the thrusters 237, 239 of the ship. In this first mode, the at least one control circuit 288 operates so that the motor generators 228, 230; 232, 234 operate in a generator mode. During this operation the motor generators operate to consume mechanical power delivered through the at least one transmission gear and generate electricity that is delivered to bus 282. This generated electrical power is used for powering the electrical power consuming devices 284 in operation on the ship.

In this exemplary system, the operator through inputs to the operator panel 290 is enabled to operate the drive platform in a second mode. In this second mode, the high power electrical generator 280 is operated to generate electricity. The electricity is directed through operation of the switching interfaces responsive to the control circuitry to cause the electrical power generated by the generator 288 to be delivered to the motor generators. The motor generators are operated in a motor mode to cause mechanical power to be delivered to the at least one transmission gear in each of the gear boxes 224 and 226. In the exemplary embodiment in this mode of operation, the control circuitry is operative to cause the interface to disengage the clutches 220 and 222. In this mode of operation, the internal combustion engines 216, 218 may be run at idle or shut off. The motor generators 228, 230; 232, 234 operate in the motor mode at speeds that are controlled by the operator through the at least one control circuit and the operator panel. In this mode the propellers of the ship operate in response to the electrical power which drives the motor generators.

In this exemplary embodiment, the operator of the ship through inputs through the operator panel 290 may operate the drive platform in a third mode of operation. In this mode of operation, the generator 278 is used to produce electrical power. The generator 278 has a substantially lower rated power output than electrical generator 280. In this mode of operation the motor generators 228, 230; 232, 234 operate in a motor mode at the lower power available from the generator 278. This mode may be used as an idle mode in which the smaller available amount of electrical power is used to drive the propellers in a manner sufficient only to provide very limited movement and/or to hold the position of the ship in a relatively stationary position. Alternatively or in addition, this mode may be used under circumstances or conditions where a very slow speed is required such as in narrow shipping channels and the like.

In this exemplary embodiment, the drive platform may also be operated in a fourth mode of operation in which power to the propellers is supplied both by the internal combustion engines as well as simultaneously by the motor generators operating in a motor mode. In such operation, the clutches 220 and 222 are engaged responsive to operation of the at least one control circuit. Electrical power from one or both of the electrical generators 278, 280 is directed to the rotatable power devices 228, 230; 232, 234 operating in a motor mode. In this arrangement, the power from the rotational power devices is added to the power available from the internal combustion engines so as to power the ship. As can be appreciated, in some exemplary arrangements the additional power provided by the rotational power devices may be directed from the lower rated power generator while in other exemplary modes of operation, the electrical power may be directed from the higher rated electrical power generator. Further in other exemplary arrangements, both generators may be operated at the same time to supply sufficient electrical power to drive the rotational power devices in a maximum driving power mode.

Figure 18:
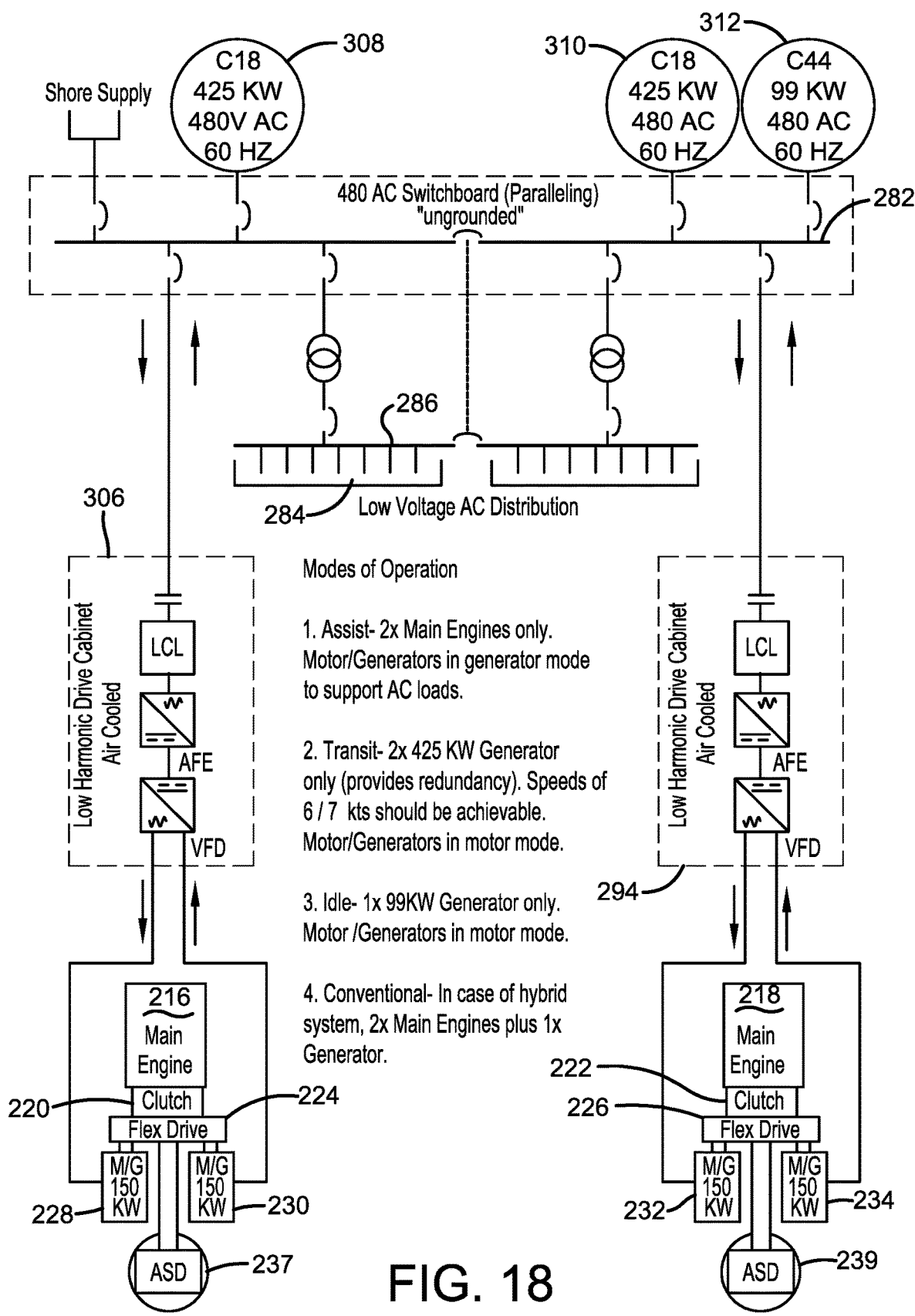
FIG. 18 is an electrical schematic representing operational modes of an alternative exemplary embodiment.

FIG. 18 shows an alternative arrangement in which three electrical generators are used as electrical power sources. This different arrangement provides the capabilities to have additional modes of operation for the system. In this alternative arrangement, an electrical generator 308 and an electrical generator 310 each have a relatively high rated electrical output compared to a third electrical generator 312. In this exemplary arrangement, the electrical generators 308, 310 and 312 are all in operative connection with bus 282. As in the previously described embodiment, bus 282 is used to deliver power to the rotatable power devices 228, 230; 232, 234 when such devices are operated in a motor mode. Bus 282 also receives electrical power when the rotatable power devices are operated in a generator mode.

The exemplary system represented in FIG. 18 is operative responsive to the operator panel and at least one control circuit to operate in multiple different modes. As with the previously described system, the propellers of the ship may be operated in response to rotational power delivered solely from the internal combustion engines 216 and 218. In this mode of operation, the at least one control circuit is operative to cause the clutches 220, 222 to be engaged. The at least one control circuit may operate to cause one or more of the rotational power devices 228, 230; 232, 234 to operate in a generator mode in which such devices consume power from the at least one transmission gear and deliver electrical energy through the respective control panel to the electrical bus of the ship. Of course it should be appreciated that in some arrangements when operating in this mode, it may not be necessary to generate electrical power from all the rotational power devices depending on the particular electrical demands of the power consuming devices 284 that are currently operating on the ship. It should be appreciated that in some exemplary embodiments, suitable control circuitry may be integrated with the control panels or other circuitry so as to match the current power delivery from the rotatable power devices to the current power consumption level on board the ship or other connected system.

The exemplary system shown in FIG. 18 also selectively enables the ship to be propelled using electrical power produced by the generators 308 and 310. In this mode of operation, the at least one control circuit operates to disengage clutches 220 and 222. In this arrangement the main engines may be operated only at idle or may be shut down. The electrical power delivered by the generators 308 and 310 is directed through operation of the at least one control circuit to rotatable power devices 228, 230; 232, 234 operating in a motor mode. The operator panel 290 enables the operator of the ship to control the speed and power delivered to the transmission gears in the gear boxes 224, 226 by the rotational power devices. In this mode, the ship is enabled to be operated solely through the use of the electrical power provided by the generators 308 and 310.

In a third mode of operation, the system is enabled to be operated by the electrical power produced solely by lower power rated generator 312. The power produced by the lower power rated generator is supplied to the rotatable power devices 228, 230; 232, 234 operating in the motor mode. Supplied energy at this lower level is usable in connection with operating the drive in an idle or other low power mode. Such a low power mode may be suitable in conditions such as those previously discussed where the propellers are operated solely to hold a position or to move at a slow speed through a channel, canal or other restricted area.

The exemplary embodiment in FIG. 18 is also operative to operate in a further mode in which both the internal combustion engines and the rotatable power devices operate in motor mode to deliver power to the thrusters of the ship. In this exemplary mode, the at least one control circuit operates responsive to inputs to the operator panel to engage the clutches 220 and 222 so that power from the internal combustion engines is delivered to the thrusters. In addition, electrical power from one or more of the generators 308, 310 and/or 312 is directed to the rotatable power devices operating in the motor mode. This additional mechanical power is delivered through the transmission gears of the gear boxes 224 and 226 to further drive the thrusters 237, 239 of the ship. Of course it should be appreciated that in different arrangements, different combinations of the low and high powered generators may be used to provide the power that supplements the power available from the internal combustion engines. Further as can be appreciated, in some exemplary arrangements the at least one control circuit may be operative to direct power so that in some modes of operation, one or more of the rotatable power devices may be operating in a motor mode while one or more of the other rotatable power devices is operating in a generator mode. This may be done based on the particular electrical power demands of the system at that time.

Further it should be understood that in alternative embodiments, systems may be configured so that the mechanical power needs of the ship are calculated based on the total power available from operating both the internal combustion engines and the rotatable power devices in the motor mode. This may enable hybrid designs in which the internal combustion engines may be smaller than would be otherwise necessary than when the ship relies on the internal combustion engines for propulsion alone.

Further in exemplary arrangements the systems may be structured so that the rotatable power devices only operate in a motor mode and not in a generator mode. In such arrangements, dedicated power generation devices may be connected to a drive coupler of the modular drive and used as necessary to generate electricity. Such arrangements with single function motors and generators may operate to simplify the control circuitry needed for operation of the system.

Further as can be appreciated, while two rotational power devices which can be used in motor mode for providing additional mechanical power to the modular drives have been shown in the exemplary embodiments, additional rotational power devices may be utilized in other embodiments. Such rotational power devices may include additional combined motor generator devices or may include devices that operate only in a motor mode. As can be appreciated, numerous different configurations and modes of operation are possible by employing the principles that have been described herein.

Although arrangements have been described based upon certain exemplary embodiments, a wide array of modifications, variations and alternative constructions are also within the spirit and scope of the principles described herein. Example arrangements for drive couplers and other related power transmission systems have been described herein with reference to particular components, features, properties, attributes, relationships and methods. However, it should be understood that in other embodiments other arrangements may include other components, features, properties, attributes, relationships and/or methods which provide similar capabilities and functionalities.

It will be readily understood that the features of exemplary embodiments as generally described and illustrated in the Figures can be arranged and designed in a wide array of different configurations. That is, features, structures, and/or characteristics of embodiments or arrangements described herein may be combined in any suitable manner in one or more other embodiments or arrangements. Thus the detailed description of the exemplary embodiments of apparatus, methods and articles as represented in the Figures is not intended to limit the scope of the embodiments as claimed, but is merely representative of selected exemplary embodiments that implement the principles as described herein.

In the foregoing description, certain terms have been used to describe example arrangements for brevity, clarity and understanding. However, certain terms such as "upward," "downward," "higher," "lower," "left," "right," "outer," "inner," "front," "rear," "top" and "bottom" have been used. However, no unnecessary limitations are to be implied therefrom because such terms have been used for descriptive purposes and are intended to be broadly construed, and the terms shall not be construed as limitations on the scope of the claims hereof. Moreover the descriptions and illustrations herein are by way of examples and the inventive teachings are not limited to the specific details that have been shown and described.

The exemplary structures and arrangements, along with the methods for configuring and using such structures and arrangements, achieve at least one of the above stated objectives, eliminate difficulties encountered in the use of prior devices and systems, solve problems and attain the desirable results described herein.

In the following claims any feature described as a means for performing a function shall be construed as encompassing any means known to those skilled in the art as being capable of performing the recited function, and shall not be deemed to be limited to the particular means used for performing the recited function in the foregoing description or mere equivalents thereof.

Having described the features, discoveries and principles of the exemplary embodiments, the manner in which they are constructed and operated, and the advantages and useful results attained, the new and useful structures, devices, elements, arrangements, parts, combinations, systems, equipment, operations, methods, processes and relationships are set forth in the appended claims.

We claim:
1. Apparatus comprising:
 a removable drive coupler, configured to operatively connect a gear box and at least one rotatable power device, wherein the at least one rotatable power device includes at least one of a motor, a generator, and a pump,
 a body,
 a rotatable ring gear within the body,
 a plurality of body openings angularly disposed on the body, wherein the ring gear is accessible through each of the plurality of body openings,
wherein the body includes a mounting flange adjacent each of the body openings,
wherein each mounting flange is configured to engage a removable cover plate, wherein the cover plate is configured to close the respective body opening,
wherein the drive coupler includes
a housing, wherein the housing includes
a pair of releasably engageable housing pieces,
a base portion that is releasably engageable with a mounting flange that is not currently engaged with a cover plate,
a pair of idler support portions, wherein each idler support portion extends transverse to the base portion,
wherein each housing piece includes a respective idler support portion,
an idler shaft, wherein the idler shaft
extends intermediate of the pair of idler support portions,
is operatively engaged with each of the pair of idler support portions, and
extends along an idler shaft axis,
an idler gear, wherein the idler gear
is rotatably mounted in operatively supported connection with the idler shaft and is rotatable about the idler shaft axis,
extends intermediate of the idler support portions, and
is configured to extend in an opening of the gear box and engage the ring gear when the base portion is operatively engaged with a respective mounting flange,
a coupling gear, wherein the coupling gear is
rotatably mounted in operatively supported connection with the housing, and
in rotatable operative connection with the idler gear,
a mounting face in operative connection with the housing,
wherein the mounting face is configured to releasably engage external of the body, a rotatable power device, and
wherein in the engaged position of the rotatable power device and the mounting face, the rotatable power device is in operative rotatable connection with the coupling gear.

2. The apparatus according to claim 1
wherein each idler support portion includes an ear.

3. The apparatus according to claim 1
wherein each housing piece includes some of the base portion.

4. The apparatus according to claim 1
wherein one of the pair of housing pieces is in operative connection with a device mounting portion, wherein the device mounting portion includes the mounting face,
wherein the rotatable power device is releasably engageable with the mounting face, wherein in the engaged position with the mounting face, the rotatable power device is in rotatable operative connection with the coupling gear.

5. The apparatus according to claim 4
wherein the other of the pair of housing pieces includes a cover face configured to releasably engage a removable cover.

6. The apparatus according to claim 4
wherein the other of the pair of housing pieces includes a further device mounting portion including a further mounting face, wherein the further mounting face is configured to releasably engage a further rotatable power device,
wherein in the engaged position of the further mounting face and the further rotatable power device, the further rotatable power device is in operative rotatable connection with the coupling gear.

7. The apparatus according to claim 6
wherein each of the device mounting portion and the further device mounting portion are releasably engageable in fixed relation with the one and the other of the pair of housing pieces respectively,
whereby one or both of the device mounting portion and the further device mounting portion are replaceable with other device mounting portions including mounting faces having different configurations than the mounting face and the further mounting face.

8. The apparatus according to claim 4
wherein the device mounting portion is releasably engageable in fixed relation with one of the pair of housing pieces,
wherein the mounting face has a configuration, whereby the device mounting portion may be disengaged from the one housing piece and a further device mounting portion having a further mounting face with a further face configuration that is different from the face configuration may be engaged with the one housing piece.

9. The apparatus according to claim 1
wherein the pair of housing pieces bound a cavity, wherein the coupling gear is rotatable in the cavity,
a pair of disposed bearings in operatively supported connection with the housing, wherein the coupling gear extends intermediate of the bearings.

10. The apparatus according to claim 9 and further including
a hub, wherein the hub is rotatable in the cavity, wherein the coupling gear is releasably engageable with the hub.

11. The apparatus according to claim 10
wherein the hub includes a shaft engaging recess, wherein the shaft engaging recess is configured to engage a power shaft of a rotatable power device.

12. The apparatus according to claim 10
wherein the base portion includes a base opening, wherein the base opening extends into the cavity, wherein the idler gear extends in the base opening.

13. The apparatus according to claim 10
wherein one of the pair of housing pieces is in operatively engaged relation with a releasable device mounting portion that includes a mounting face, and the other of the pair of housing pieces includes a cover face configured to releasably engage a cover,
wherein one of the bearings in the pair of bearings is in supported engagement with the cover and the other of the bearings in the pair of bearings is in supported engagement with the device mounting portion.

14. The apparatus according to claim 10
wherein the hub includes a first annular step and a second annular step, wherein the annular steps are coaxially arranged and disposed from one another along a direction of an axis of rotation of the coupling gear, wherein one bearing of the pair is disposed immediately adjacent to the first annular step and the other bearing of the pair is disposed immediately adjacent to the second annular step.

15. The apparatus according to claim 10
wherein the base portion includes a planar base face, and wherein the mounting flange includes a planar flange face,
wherein the planar base face and the planar flange face are configured to be engaged in adjacent aligned fixed relation when the coupler device is in operative connection with the gear box.

16. The apparatus according to claim 15
wherein the planar flange face includes a plurality of body fastener accepting openings therein, and
wherein the planar base face includes a plurality of housing fastener accepting openings therein,
wherein the housing fastener accepting openings and the body fastener accepting openings are aligned when the drive coupler is engaged in fixed relation with the gear box.

17. Apparatus comprising:
at least two removable drive couplers, each configured to operatively connect a gear box and at least one rotatable power device,
wherein the gear box includes
a body,
at least one rotatable internal transmission gear within the body,
a plurality of body openings angularly disposed on the body,
wherein the at least one rotatable internal transmission gear is accessible through each of the plurality of body openings,
wherein the body includes a mount adjacent each of the body openings,
wherein each drive coupler includes
a housing, wherein the housing includes
a pair of releasably engageable housing pieces,
a base portion that is releasably engageable with any mount that is not currently engaged with another drive coupler,
a pair of idler support portions, wherein each idler support portion extends transverse to the base portion,
wherein each housing piece includes a respective idler support portion,
an idler shaft,
wherein the idler shaft
extends intermediate of the pair of idler support portions,
is operatively engaged with each of the pair of idler support portions, and
extends along an idler shaft axis,
an idler gear, wherein the idler gear
is rotatably mounted in operatively supported connection with the idler shaft and is rotatable about the idler shaft axis,
extends intermediate of the idler support portions, and
is configured to extend in an opening of the gear box and engage the at least one rotatable internal transmission gear when the base portion is operatively engaged with a respective mount,
a coupling gear,
wherein the coupling gear is rotatably mounted in operatively supported connection with the housing, wherein the coupling gear is in rotatable operative connection with the idler gear,
a mounting face in operative connection with the housing,
wherein the mounting face is configured to releasably engage external of the body, a respective rotatable power device, wherein in the engaged position of the rotatable power device and the mounting face, the rotatable power device is in operative rotatable connection with the coupling gear and the at least one internal transmission gear.

18. Apparatus comprising:
a removable drive coupler configured to operatively connect a gear box and at least one rotatable power device,
wherein the at least one rotatable power device includes at least one of a motor, a generator, and a pump,
wherein the gear box includes
a body,
a rotatable ring gear within the body,
a plurality of body openings angularly disposed on the body,
wherein the ring gear is accessible through each of the plurality of body openings,
wherein the body includes a respective mounting flange adjacent to each of the respective body openings,
wherein each mounting flange is configured to engage a respective removable cover plate, wherein the cover plate is configured to close the respective body opening,
wherein the drive coupler includes
a housing,
wherein the housing includes
a base portion that is releasably engageable with a mounting flange that is not currently engaged with a cover plate,
a pair of disposed idler support portions, wherein each idler support portion extends transverse of the base portion,
an idler shaft,
wherein the idler shaft
extends along an idler shaft axis, and
is operatively engaged with each of the idler support portions,
an idler gear,
wherein the idler gear
is in operatively supported connection with the housing,
is rotatable about the idler shaft axis,
extends intermediate of the idler support portions, and
is configured to extend in an opening of the gear box and engage the ring gear when the base portion is operatively engaged with a respective mounting flange,
wherein each idler support portion is configured such that the idler shaft is operatively engageable with each idler support portion in different locations, whereby idler gears having different diameters may be included in the drive coupler,
a coupling gear,
wherein the coupling gear is rotatably mounted in operatively supported connection with the housing, wherein the coupling gear is in rotatable operative connection with the idler gear,
a mounting face in operative connection with the housing, wherein the mounting face is configured to releasably engage external of the body, a rotatable power device, wherein in the engaged position of the rotatable power device and the mounting face, the rotatable power device is in operative connection with the coupling gear.

19. The apparatus according to claim 18 wherein the housing comprises a pair of releasably engageable housing pieces, wherein each respective housing piece includes some of the base portion.

20. The apparatus according to claim 18 wherein the housing comprises a pair of releasably engageable housing pieces, wherein one housing piece is in operatively engaged relation with the mounting face, and the other housing piece is in operatively engaged relation with a cover face that is releasably engageable with a removable cover.

21. Apparatus comprising:
at least two removable drive couplers, wherein each drive coupler is in operative connection with a gear box, wherein each drive coupler is configured to operatively connect to a respective at least one rotatable power device,
wherein the gear box includes
  a body, wherein the body bounds a body interior area,
  one rotatable internal transmission gear, wherein the internal transmission gear is fully housed within the body interior area,
  more than two body openings, wherein each body opening is angularly disposed on the body from every other body opening,
    wherein each body opening extends through the body to the body interior area,
    wherein the internal transmission gear is accessible through each of the body openings,
  wherein the body includes adjacent to each respective body opening, a respective mounting surface, wherein the respective mounting surface extends in surrounding relation of the respective body opening,
wherein each drive coupler includes
  a housing, wherein the housing includes
    a pair of releasably engageable housing pieces,
    a base portion that is releasably operatively engageable with any mounting surface that is not currently engaged with another drive coupler,
    a pair of idler support portions, wherein each idler support portion extends transverse to the base portion,
    wherein each housing piece includes a respective idler support portion,
  an idler shaft,
    wherein the idler shaft
      extends intermediate of the pair of idler support portions,
      is operatively engaged with each of the pair of idler support portions, and
      extends along an idler shaft axis,
  an idler gear, wherein the idler gear
    is rotatably mounted in operatively supported connection with the idler shaft and is rotatable about the idler shaft axis,
    extends intermediate of the idler support portions, and
    is configured to extend in a body opening of the gear box and engage the rotatable internal transmission gear within the body interior area when the base portion is operatively engaged with the respective mounting surface,
  a coupling gear,
    wherein the coupling gear is rotatably mounted in operatively supported connection with the housing, wherein the coupling gear is in rotatable operative connection with the idler gear,
  a mounting face,
    wherein the mounting face
      is in operative connection with the housing, and
      is configured to releasably engage external of the body, a respective rotatable power device,
    whereby in the engaged position of the rotatable power device and the mounting face, and with the base portion of the respective drive coupler in operative engagement with a respective mounting surface, the rotatable power device is in operative rotatable connection with the coupling gear and the internal transmission gear.

22. Apparatus comprising:
a drive coupler, wherein the drive coupler is in releasable operative connection with a gear box, wherein the drive coupler is configured to operatively connect the gear box and at least one rotatable power device located outside the gear box, wherein the at least one rotatable power device includes at least one of a motor, a generator, and a pump,
wherein the gear box includes
  a body,
  one rotatable ring gear that is housed fully within the body,
  wherein the body includes a plurality of body openings, wherein
  each body opening is angularly disposed from each of the other body openings on the body,
    wherein the ring gear is accessible through each of the plurality of body openings,
  wherein the body includes a plurality of external mounting flanges, wherein one respective external mounting flange extends adjacent to one respective body opening,
    wherein each mounting flange when not engaged with a respective drive coupler, is configured to engage a respective removable cover plate, wherein the cover plate is configured to close the respective body opening,
wherein the drive coupler includes
  a housing, wherein the housing includes
    a pair of releasably engageable housing pieces,
    a base portion, wherein the base portion is releasably engageable with any respective mounting flange that is not currently engaged with another drive coupler or cover plate,
    a pair of idler support portions, wherein each idler support portion extends transverse to the base portion,
    wherein each housing piece includes a respective idler support portion,
  an idler shaft,
    wherein the idler shaft
      extends intermediate of the pair of idler support portions,
      is operatively engaged with each of the pair of idler support portions, and
      extends along an idler shaft axis,
  an idler gear, wherein the idler gear is rotatably mounted in operatively supported connection with the idler shaft and is rotatable about the idler shaft axis, extends intermediate of the idler support portions, and is configured to extend in a respective body opening of the gear box and engage the ring gear within the body when the base portion of the drive coupler is operatively engaged with the respective mounting flange, a coupling gear,
wherein the coupling gear is rotatably mounted in operatively supported connection with the housing, wherein the coupling gear is in rotatable operative connection with the idler gear, a mounting face,
wherein the mounting face is in operative connection with the housing,
wherein the mounting face is configured to releasably engage external of the body, a respective rotatable power device,
whereby in the engaged position of the respective rotatable power device and the mounting face, the rotatable power device is in operative rotatable connection with the ring gear.

23. The apparatus according to claim 22
wherein the drive coupler further includes a further mounting face, wherein the further mounting face is in operative connection with the housing and in opposed facing relation of the mounting face,
wherein the further mounting face is configured to releasably operatively engage external of the body, a further rotatable power device,
whereby in the engaged position of the further rotatable power device and the further mounting face, both the rotatable power device and the further rotatable power device are in operative rotatable connection with the ring gear.

24. The apparatus according to claim 22
wherein each respective housing piece includes some of the base portion,
wherein disengagement of the housing pieces enables external access from outside the housing to at least one of the coupling gear and the idler gear.

25. The apparatus according to claim 22
wherein each idler support portion is configured such that the idler gear is operatively engageable with each idler support portion in different locations, whereby idler gears having different diameters may be included in the drive coupler.

26. Apparatus comprising:
at least two removable drive couplers, wherein each drive coupler is in operative connection with a gear box, wherein each drive coupler is configured to operatively connect to a respective at least one rotatable power device,
wherein the gear box includes
a body, wherein the body bounds a body interior area,
one rotatable internal transmission gear, wherein the internal transmission gear is fully housed within the body interior area,
at least five body openings, wherein each body opening is angularly disposed on the body from every other body opening,
wherein each body opening extends through the body to the body interior area,
wherein the internal transmission gear is accessible through each of the body openings,
wherein the body includes adjacent to each respective body opening, a respective mounting surface,
wherein the respective mounting surface extends in surrounding relation of the respective body opening,
wherein each drive coupler includes
a housing,
wherein the housing includes a base portion that is releasably operatively engageable with any mounting surface that is not currently engaged with another drive coupler or closed by a cover plate,
an idler gear,
wherein the idler gear is rotatably mounted in operatively supported connection with the housing and is configured to extend in a body opening of the gear box and engage the rotatable internal transmission gear within the body interior area when the base portion is operatively engaged with the respective mounting surface,
a coupling gear,
wherein the coupling gear is rotatably mounted in operatively supported connection with the housing, wherein the coupling gear is in rotatable operative connection with the idler gear,
a mounting face,
wherein the mounting face
is in operative connection with the housing, and
is configured to releasably engage external of the body, a respective rotatable power device,
whereby in the engaged position of the rotatable power device and the mounting face, and with the base portion of the respective drive coupler in operative engagement with a respective mounting surface, the rotatable power device is in operative rotatable connection with the coupling gear and the internal transmission gear,
and wherein at least one body opening is unoccupied by a respective drive coupler,
wherein a respective unoccupied body opening is closed by engagement of the respective mounting surface of the unoccupied body opening with a respective cover plate.

27. The apparatus according to claim 26
wherein the housing includes a pair of disposed idler support portions, wherein each idler support portion extends transverse to and outward away from the base portion,
wherein the idler gear is rotatably mounted in operatively supported connection with each of the idler support portions.

28. Apparatus comprising:
a removable drive coupler, configured to operatively connect a gear box and at least one rotatable power device, wherein the at least one rotatable power device includes at least one of a motor, a generator and a pump,
wherein the gear box includes
a body,
a rotatable ring gear within the body,
a plurality of body openings angularly disposed on the body,
wherein the ring gear is directly engageably accessible through each one of the plurality of body openings, wherein the body includes a plurality of mounting flanges, wherein each respective mounting flange extends adjacent to a respective one of the body openings, at least one removable cover plate, wherein each cover plate is configured to close any respective one of the plurality of body openings, and wherein each mounting flange is configured to releasably engage one respective removable cover plate, wherein the drive coupler includes a housing, wherein the housing includes a pair of releasable housing pieces, a base portion that is releasably engageable with any mounting flange of the plurality of mounting flanges that is not currently engaged with a cover plate, a pair of idler support portions, wherein each idler support portion extends transverse to the base portion, wherein each housing piece includes a respective idler support portion, an idler shaft, wherein the idler shaft extends intermediate of the pair of idler support portions, is operatively engaged with each of the pair of idler support portions, and extends along an idler shaft axis, an idler gear, wherein the idler gear is rotatably mounted in operatively supported connection with the idler shaft and is rotatable about the idler shaft axis, extends intermediate of the idler support portions, and is configured to extend in an opening of the gear box and directly engage the ring gear when the base portion is operatively engaged with any respective mounting flange, a coupling gear, wherein the coupling gear is rotatably mounted in operatively supported connection with the housing, wherein the coupling gear is in rotatable operative connection with the idler gear, a mounting face in operative connection with the housing, wherein the mounting face is configured to releasably engage external of the body, a rotatable power device, wherein in the engaged position of the rotatable power device and the mounting face, the rotatable power device is in operative rotatable connection with the coupling gear.

29. Apparatus comprising:

a drive coupler, wherein the drive coupler is in releasable operative connection with a gear box, wherein the drive coupler is configured to operatively connect the gear box and at least one rotatable power device located outside the gear box, wherein the at least one rotatable power device includes at least one of a motor, a generator, and a pump, wherein the gear box includes a body, one rotatable ring gear that is housed fully within the body, wherein the body includes a plurality of body openings, wherein each body opening is angularly disposed from each of the other body openings on the body, wherein the ring gear is accessible through each of the plurality of body openings, wherein the body includes a plurality of external mounting flanges, wherein one respective external mounting flange extends adjacent to one respective body opening, wherein each mounting flange when not engaged with a respective drive coupler, is configured to engage a respective removable cover plate, wherein the cover plate is configured to close the respective body opening, wherein the drive coupler includes a housing, wherein the housing includes a base portion, wherein the base portion is releasably engageable with any respective mounting flange that is not currently engaged with another drive coupler or cover plate, a pair of disposed idler support portions, wherein each idler support portion extends transverse to and outward away from the base portion, an idler gear, wherein the idler gear is rotatably mounted in operatively supported connection with each of the idler support portions, and is configured to extend in a respective body opening of the gearbox and engage the ring gear within the body when the base portion of the drive coupler is operatively engaged with the respective mounting flange, wherein each idler support portion is configured such that the idler gear is operatively engageable with each idler support portion in different locations, whereby idler gears having different diameters may be included in the drive coupler, a coupling gear, wherein the coupling gear is rotatably mounted in operatively supported connection with the housing, and in rotatable operative connection with the idler gear, a mounting face, wherein the mounting face is in operative connection with the housing, wherein the mounting face is configured to releasably engage external of the body, a respective rotatable power device, whereby in the engaged position of the respective rotatable power device and the mounting face, the rotatable power device is in operative rotatable connection with the ring gear.

* * * * *